US005879505A

United States Patent [19]

Fujisawa et al.

[11] Patent Number: 5,879,505

[45] Date of Patent: Mar. 9, 1999

[54] SHEET SEPARATOR FOR IMAGE RECORDING PROCESS

[75] Inventors: Hiroyuki Fujisawa; Mikizo Katsuyama; Toshimitsu Funayoshi; Mamoru Fujimoto, all of Kyoto, Japan

[73] Assignee: Dainippon Screen Mfg. Co., Ltd., Japan

[21] Appl. No.: 876,643

[22] Filed: Jun. 16, 1997

[30] Foreign Application Priority Data

| | | | |
|---|---|---|---|
| Jun. 18, 1996 | [JP] | Japan | 8-178617 |
| Jul. 16, 1996 | [JP] | Japan | 8-206596 |
| Jul. 16, 1996 | [JP] | Japan | 8-206597 |

[51] Int. Cl.[6] .......... B32B 35/00

[52] U.S. Cl. .......... 156/344; 156/584; 430/256; 271/281; 271/284

[58] Field of Search .......... 156/344, 584; 271/280, 281, 282, 283, 284, 285, 286; 430/256, 259, 260, 261, 262

[56] References Cited

U.S. PATENT DOCUMENTS

| | | | |
|---|---|---|---|
| 3,040,866 | 6/1962 | Rehm | 271/284 X |
| 3,162,436 | 12/1964 | Halden | 271/284 |
| 3,266,797 | 8/1966 | Stievenart | 271/285 |
| 4,173,510 | 11/1979 | Tobey | 156/584 |
| 4,183,751 | 1/1980 | Matsumoto et al. | 156/584 X |
| 4,735,407 | 4/1988 | Ozawa | 271/283 X |
| 5,139,386 | 8/1992 | Honegger et al. | 271/283 X |
| 5,141,584 | 8/1992 | Schuh et al. | 156/344 |
| 5,358,591 | 10/1994 | Candore | 156/344 |
| 5,569,354 | 10/1996 | Day | 156/344 X |
| 5,656,127 | 8/1997 | De Biel et al. | 156/344 X |

FOREIGN PATENT DOCUMENTS

| | | | |
|---|---|---|---|
| 134502 | 3/1960 | U.S.S.R. | 271/284 |

*Primary Examiner*—Mark A. Osele
*Attorney, Agent, or Firm*—Ostrolenk, Faber, Gerb & Soffen, LLP

[57] ABSTRACT

In a separator for separating a stripping sheet from a composite film formed by a base sheet and the stripping sheet which are superposed with each other, the composite film is first so carried and arranged that its forward end portion extends over a separating clearance formed in a support, and then a blade is pushed into the separating clearance for thrusting the composite film into the separating clearance in a bent state. Thus, the forward end portion of the composite film is separated (i.e., delaminated). Thereafter the base sheet and the stripping sheet are independently sucked/held on the delaminated forward end portion, and the stripping sheet is completely separated from the base sheet while widening the space between the held positions of these sheets. Due to the aforementioned structure and operation, the composite film can be separated in a simple structure with minimum force, and the separator can be reduced in size and power.

21 Claims, 19 Drawing Sheets

SHEET SEPARATOR FOR IMAGE RECORDING PROCESS

BACKGROUND OF THE INVENTION

1. Field of the Invention

The present invention relates to an apparatus for separating a plurality of sheets laminated in the form of a composite film, which is available in an image recording process.

2. Description of the Background Art

In a general image recording unit, for a printing process an unexposed photosensitive film is drawn out from a long film which is wound in the form of a roll and attached onto an outer peripheral surface of a drum in a prescribed length to be exposed through irradiation with a laser beam or the like. The exposed films formed with latent images are successively rolled-up and a number of rolled-up exposed films are developed by an automatic developing apparatus or processor which is provided independently of the image recording unit, for preparing a number of process films through single development.

Therefore, films exposed by the image recording unit must be temporarily carried to the automatic developing apparatus while the same are rendered not exposed by external light, to be charged into and developed in the automatic developing apparatus. Thus, these steps are so complicated that productivity is inevitably reduced.

In recent years, on the other hand, a composite film requiring no developing step is provided. As shown in FIG. 1A, a composite film 1 for image recording is formed by a base sheet 3 provided with a color material layer 2 and a stripping sheet 5 which is separably stuck to the color material layer 2 through an adhesive layer 4, and the stripping sheet 5 is generally formed to be smaller in thickness as compared with the base sheet 3.

When this composite film 1 is exposed, a color material portion which is irradiated with a laser beam in the color material layer 2 loses bonding strength with respect to the base sheet 3, and is separated and removed from the base sheet 3 along with the adhesive layer 4, following separation of the stripping sheet 5, as shown in FIGS. 1B and 1C. Thus, a base sheet, i.e., an image formation sheet 7 (image recording film) recording image information is obtained. In another type of composite film, a portion of a color material layer 2 irradiated with a laser beam acquires bonding strength with respect to a base sheet 3, and a color material portion not irradiated with the laser beam is separated and removed from the base sheet 3 along with a stripping sheet 5 in this case.

The aforementioned composite film 1 is also provided in the form of a rolled long film in general, and an operation of forming an image on the composite film 1 which is cut into a proper length and exposing the same is continuously performed so that the cut film is generally handled as a square sheet type composite film 1 after the exposure.

An unnecessary sheet must be separated and removed from the exposed square sheet type composite film 1 in order to obtain the image formation sheet 7. No means of efficiently separating and removing the unnecessary sheet from the exposed composite film 1 has yet been established in the image recording unit employing the composite film 1, under the present circumstances.

In the image recording unit employing such a composite film 1, the stripping sheet 5 falls into disuse after the exposure, and this unnecessary sheet 5 is collected and discarded after separated from the base sheet 3.

In general, a collection area such as a trash can or the like is generally provided in the exterior of a processing unit such as the image recording unit so that the unnecessary sheet carried from the processing unit is dropped and collected therein. On the other hand, there has been made a trial of carrying the unnecessary sheet inside a ring-shaped guide for rolling and collecting the sheet therein.

If the collection area such as a trash can is provided, however, a space is required in the exterior of the processing unit and the space for installing the unit is disadvantageously increased. Further, unnecessary sheets simply dropped in the collection area bulkily heap up therein, and hence the size of the collection area must be increased in order to increase the amount of collection. On the other hand, the method of collecting the unnecessary sheets while rolling the same inside the ring-shaped guide is impractical since trouble such as jamming readily takes place in collection and the amount of collection is limited to several sheets.

The present invention is not restricted to the collection of the aforementioned unnecessary sheets, but is also applicable to the simple and compact collection of various types of sheets such as photographs and printed matters and ink sheets in DDCP (digital direct color proofer).

SUMMARY OF THE INVENTION

According to the present invention, a separator for separating first and second sheets which are laminated in the form of a composite film comprises a) end portion separator means for separating (i.e., delaminating) the first and second sheets at an end portion of the composite film, and b) overall separator means for physically separating the first and second sheets overall the composite film. The composite film can be separated with extremely small force, and the separator can be reduced in size and power.

According to the present invention, the end portion separator means comprises a-1) frame means for defining a clearance on which the composite film is supplied such that the end portion of the composite film bridges the clearance, a-2) thrust means for thrusting the end portion of the composite film into the clearance while bending the end portion, thereby separating the first and second sheets at said end portion, and a-3) handling means for ejecting the end portion from the clearance. The end portion of the composite film can be readily separated by simply thrusting the end portion into the separating clearance in a bent state. Further, the member having the separating clearance and the thrust means may be provided in separation of the end portion, and the structure of the separator may be simple.

In an aspect of the present invention, the thrust means comprises a-2-1) a blade receivable in the clearance, and a-2-2) driving means for pushing the blade into the clearance and for pulling the blade out of the clearance.

Further, in another aspect of the present invention, the composite film is a preceding composite film followed by a subsequent composite film which is also comprised of first and second sheets, the first sheet separated from the preceding composite film is defined as a preceding first sheet, the first sheet separated from the subsequent composite film is defined as a subsequent first sheet, the separator further comprises c) superposing means for superposing a forward end of the subsequent first sheet to a rear end of the preceding first sheet, to thereby obtain a train of first sheets, d) a roll-up shaft for rolling-up the train of first sheets such that the forward end of the subsequent first sheet is inserted between the rear end of the preceding first sheet and the roll-up shaft, and e) a roller for pressing the train of first sheets to the roll-up shaft.

According to the present invention, discontinuously carried stripping sheets can be successively rolled up, whereby a number of sheets can be reliably and stably collected compactly.

Further, in another aspect of the present invention, the overall separator means comprises b-1) first and second rollers between which an adhesive tape is supplied, b-2) means for serially supplying the composite film on the adhesive tape between the first and second rollers, b-3) means for rotating the first and second rollers, whereby respective portions of the first sheet are adhered to corresponding portions of the adhesive tape, and b-4) means for pulling the adhesive tape from the first and second rollers to a direction different from that for feeding the composite film, to thereby separate the first and second sheets overall the composite film.

According to the present invention, the stripping sheet can be simultaneously separated and rolled up/collected, the collected stripping sheet can be readily discarded, and no large space area is required for collecting the stripping sheet.

The present invention is also directed to a method of separating a composite film.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<1. First Embodiment>

<1.1 Separator in Image Recording Unit>

Before explaining a separator for a composite film according to the present invention, an image recording unit employing the separator is referred to for describing its overall structure and a flow of a composite film.

Figure 1A:
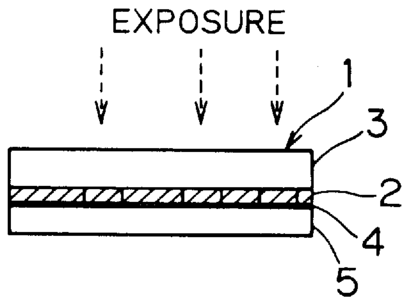
FIG. 1A illustrates the structure of a composite film.
Figure 1B:
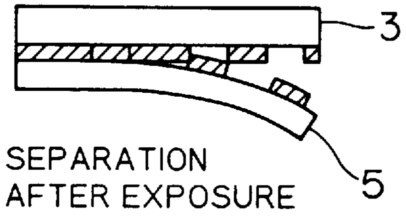
FIG. 1B illustrates a state of separating respective sheets of the composite film.
Figure 1C:
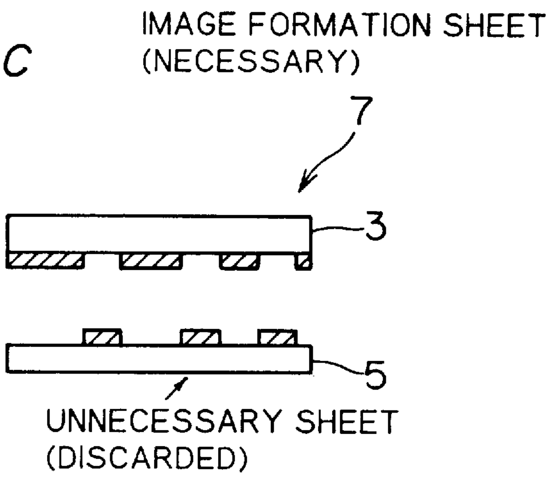
FIG. 1C illustrates the composite film separated into a base sheet and a stripping sheet.
Figure 2:
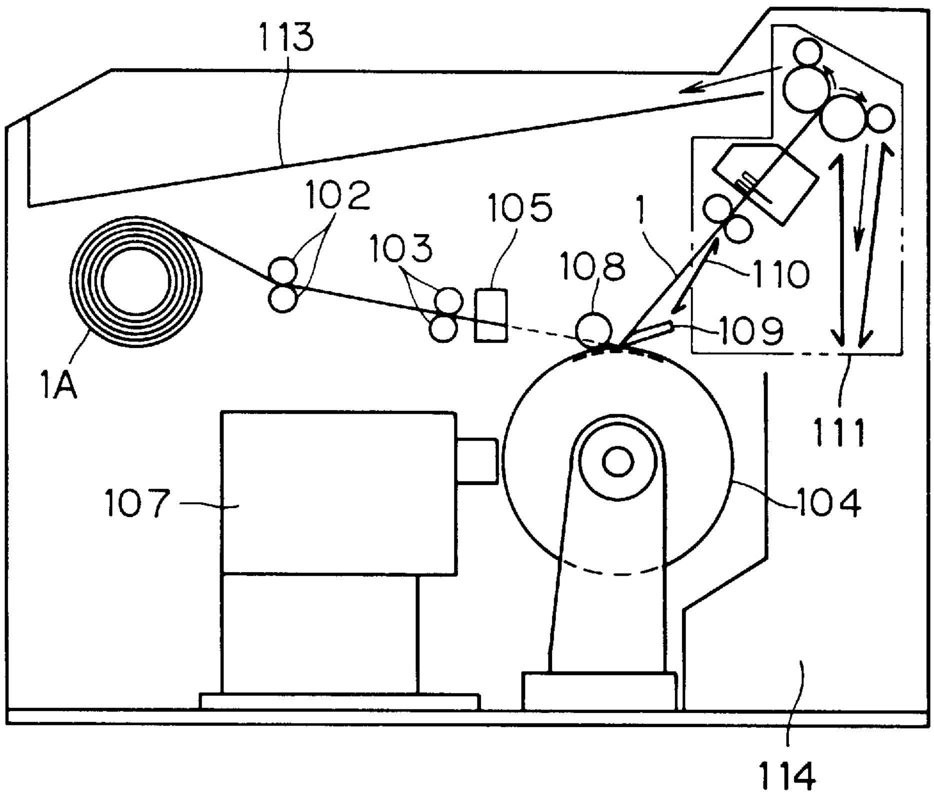
FIG. 2 schematically illustrates the structure of a process image recording unit having a separator according to a first embodiment of the present invention.

FIG. 2 is a diagram showing an image recording unit employing a long photosensitive composite film. A photosensitive composite film roll 1A which is an unexposed composite film 1 wound in the form of a roll is drawn out and delivered by carrier rollers 102 and 103, the composite film 1 is cut into a proper length by a film cutter 105, and the cut composite film 1 is wound in close contact on an outer peripheral surface of an exposure drum 104 through a squeeze roller 108. The composite film 1 wound on the exposure drum 104 is vacuum-sucked by a number of suction holes provided on the outer peripheral surface of the exposure drum 104, to be brought into close contact with/fixed to the same.

The exposure drum 104 is rotated so that the composite film 1 provided thereon is irradiated with a laser beam from an optical unit 107, to be selectively exposed. The exposure drum 104 is provided on its outer peripheral surface with a groove for receiving a forward end portion of a separating pawl 109, so that the forward end portion of the separating pawl 109 is inserted in the groove exposed on the outer peripheral surface of the exposure drum 104 between forward and rear ends of the composite film 1 after the composite film 1 is exposed, and the composite film 1 is separated from the rotated exposure drum 104, to be fed into a separator 111 according to the present invention through a carrier guide 110.

In the exposed composite film 1, a stripping sheet 5 is separated from a base sheet 3 by the separator 111 according to the present invention, so that an image formation sheet 7 fixing a color material portion to the base sheet 3 is obtained and discharged into an upper tray 113 of the image recording unit. On the other hand, the stripping sheet 5 is thrown into a collection area 114 and properly collected.

<1.2 Structure of Separator>

Figure 3:
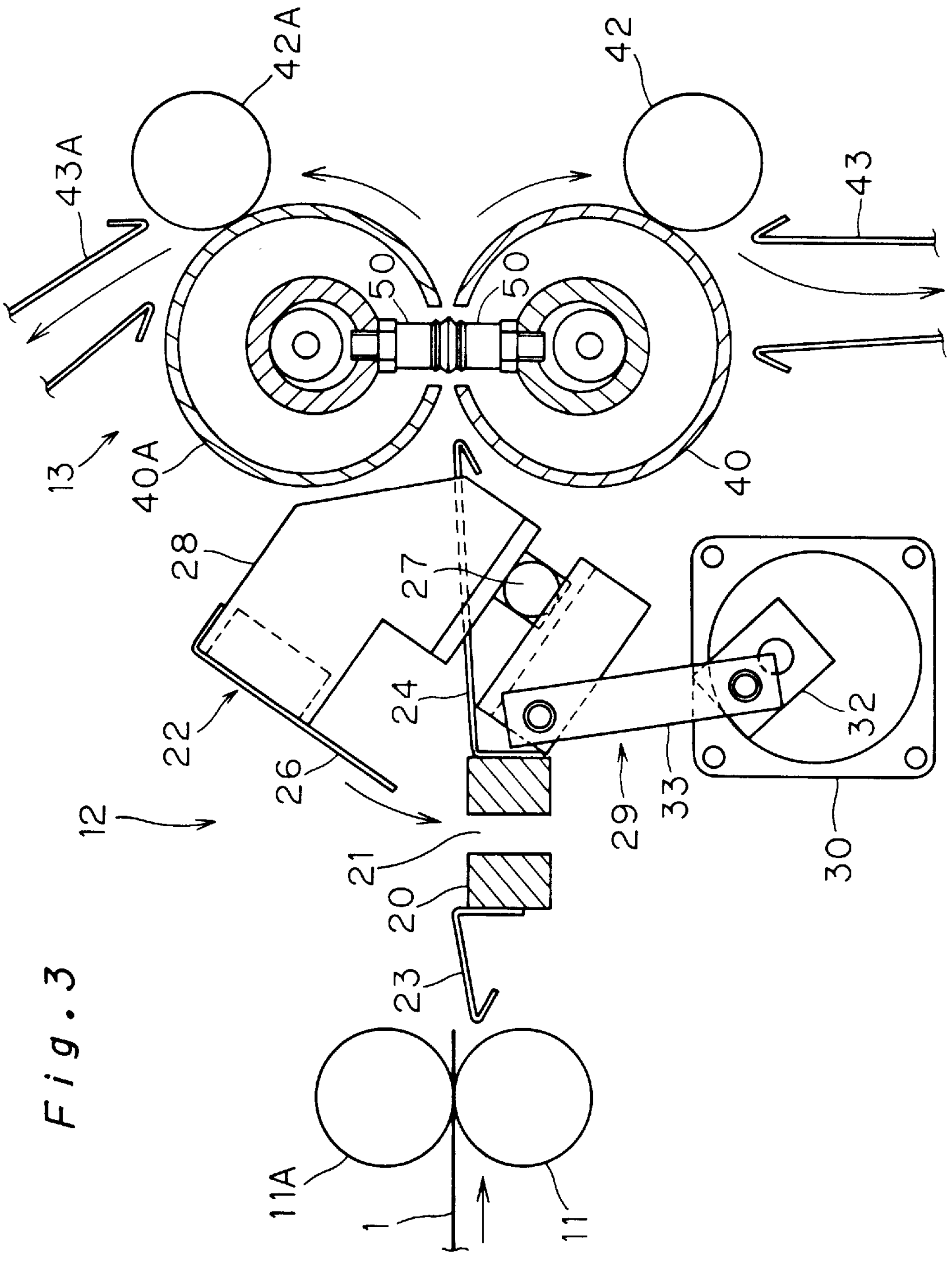
FIG. 3 illustrates the structure of the separator according to the first embodiment of the present invention.

As shown in FIG. 3, the separator according to the present invention is formed by a pair of carrier rollers 11 and 11A for carrying the square sheet type composite film 1 which is cut into the prescribed length while holding the same therebetween, a forward end separating (i.e., delaminating) part 12 for separating (delaminating) respective sheets at a forward end portion of the composite film 1 carried by the carrier rollers 11 and 11A, and an overall separating part 13 for holding forward end portions of the base sheet 3 and the stripping sheet 5 of the composite film 12 separated from each other by the forward end separating part 12 and separating respective sheets of the overall composite film 1. In the following description, it is assumed that the stripping sheet 5 is on an upper side of the drawings, for convenience of illustration.

A set position of the rotation axis of one (lower in FIG. 3) carrier roller 11 is fixed while the rotation axis of the other carrier roller 11A is rendered radially movable on the illustrated plane with respect to the fixed carrier roller 11, and this carrier roller 11A is urged against the fixed carrier roller 11 by a spring or its own weight, so that the carrier rollers 11 and 11A can hold the composite film 1 between opposite portions of outer peripheral surfaces thereof. The fixed carrier roller 11 is driven by rotation driving means such as a motor to he normally and reversely rotatable and stoppable, while the other carrier roller 11A is slaved/driven through the composite film 1 in this case. In order to reliably carry the composite film 1, toothed gears or belt transmission members may be provided on the carrier rollers 11 and 11A for transmitting rotation from the driving carrier roller 11 to the driven carrier roller 11A, as a matter of course. The outer peripheral surfaces of the carrier rollers 11 and 11A may be covered with lining layers made of a readily elastically deformable material such as rubber having a large coefficient of friction.

The aforementioned forward end separating (delaminating) part 12 comprises a support 20 which is set downstream the carrier rollers 11 and 11A and has a separating clearance 21 capable of receiving the composite film 1 in a bent state, and an insertion mechanism part 22 for inserting the forward end portion of the composite film 1 which is carried in a state extending over the separating clearance 21 therein in the bent state, and the support 20 is provided with carrier guides 23 and 24 extended toward the carrier rollers 11 and 11A and the insertion mechanism part 22 respectively.

The insertion mechanism part 22 comprises an insertion blade 26 for inserting the forward end portion of the composite film 1 in the separating clearance 21 in the bent state, a rocking member 28 provided with the insertion blade 26 on its upper portion for advancing/retreating a forward end portion of the insertion blade 26 into/from the separating clearance 21 by rocking about its rotation axis 27, a link mechanism 29 for rocking the rocking member 28 about the rotation axis 27, and a drive motor 30 having a rotation stop function for rocking the rocking member 28 through the link mechanism 29, while the link mechanism 29 is formed by an arm member 32 which is fixed to an output shaft of the drive motor 30 and a link plate 33 having ends which are pivotally connected to the arm member 32 and a lower portion of the rocking member 28 respectively.

The overall separating part 13 comprises a pair of sucker rollers 40 and 40A for holding the forward end portions of the base sheet 3 and the stripping sheet 5 of the composite film 1 separated by the forward end separating part 12 therebetween and separating physically the same from each other while sucking/holding the forward end portions by a number of suction members 50 provided along directions of roller axes, and presser rollers 42 and 42A which are in contact with outer peripheral surfaces of the sucker rollers 40 and 40A in pressing states to be slaved/rotated following rotation thereof are provided on delivery sides of the sucker rollers 40 and 40A respectively and carrier guides 43 and 43A for guiding the base sheet 3 and the stripping sheet 5 downstream are provided on delivery sides of the presser rollers 42 and 42A respectively. Rotation axes of the presser rollers 42 and 42A are urged against the sucker rollers 40 and 40A by springs (not shown), to be capable of pressing the outer peripheral surfaces of the sucker rollers 40 and 40A.

A set position of the rotation axis of one (lower in FIG. 3) sucker roller 40 is fixed while the other (upper in FIG. 3) sucker roller 40A is supported in the plane of FIG. 3 to be slightly approachable/separable to/from the fixed sucker roller 40 so that the composite film 1 can be held between the rollers 40 and 40A, and this movable sucker roller 40A is urged against the fixed sucker roller 40) by a spring or its own weight.

Figure 4:
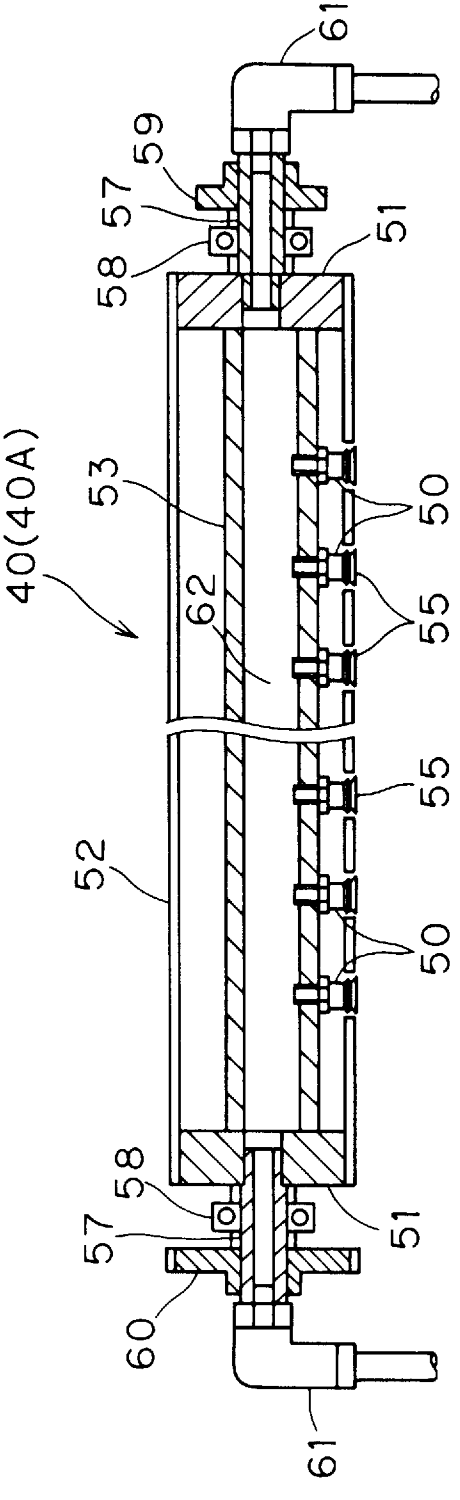
FIG. 4 is a sectional view showing the structure of a sucker roller in the separator shown in FIG. 3.

In each of the sucker rollers 40 and 40A, a pipe 53 is airtightly arranged inside a roller cylinder 52 which is provided between right and left end plates 51, so that the number of suction members 50 are connected to the pipe 53 in the direction of the roller axis and forward end suction parts 55 thereof are slightly exposed from outer peripheral surfaces through openings provided in the roller cylinder 52, as shown in FIG. 4. Bearings 58 for rotatably supporting the sucker roller 40 or 40A are mounted on roller shafts 57 which are provided on the end plates 51 while a toothed gear 60 is provided on one of the roller shafts 57 for transmitting reverse rotation to the other sucker roller 40A or 40, and rotary hose joints 61 are connected to end portions of the roller shafts 57. Further, the fixed sucker roller 40 shown in FIG. 4 is provided with a pulley 59 for rotation driving. The roller shafts 57 are provided therein with intake paths communicating with the rotary hose joints 61 and a vacuum chamber 62 provided in the pipe 53, while the rotary hose joints 61 are pipingly connected with vacuum pumps through vacuum electromagnetic valves and vacuum tanks (not shown). The outer peripheral surfaces of the sucker rollers 40 and 40A may also be covered with lining layers of a material such as rubber having a large coefficient of friction.

<1.3 Operation of Separator>

Operations of the respective parts of the separator according to the present invention are now described.

Figure 5:
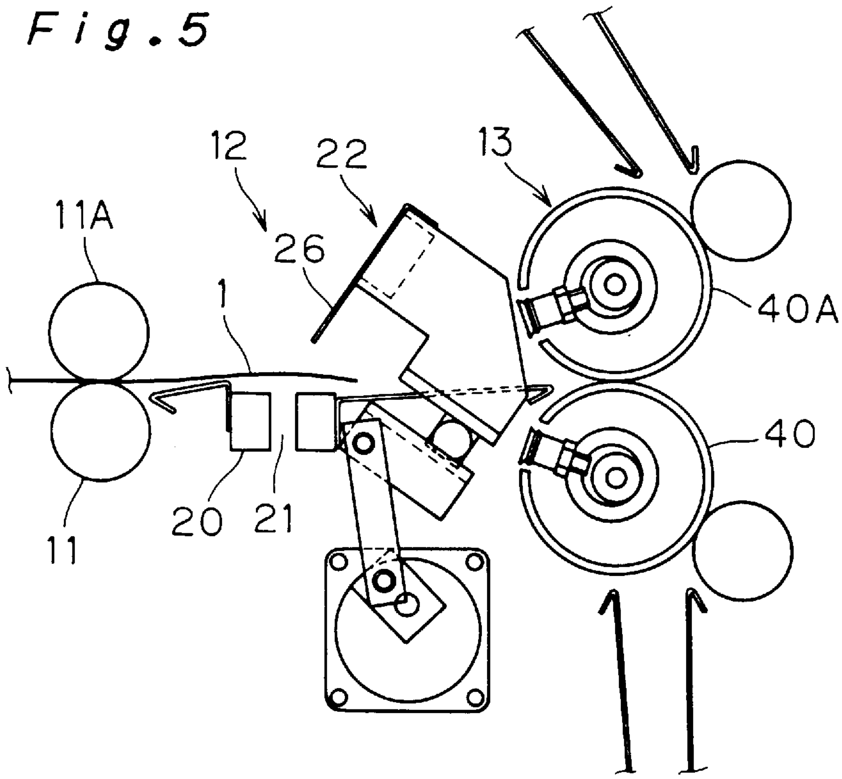
FIG. 5 illustrates a step of a separating operation by the separator for showing an unseparated state of a composite film.

The exposed composite film 1 is carried to the forward end separating (delaminating) part 12 by the carrier rollers 11 and 11A as shown in FIG. 5, while the carrier rollers 11 and 11A are stopped when the forward end of the composite film 1 reaches a position for extending over the separating clearance 21 of the support 20. The forward end position of the composite film 1 is detected by a proper detector such as a photosensor.

Figure 6:
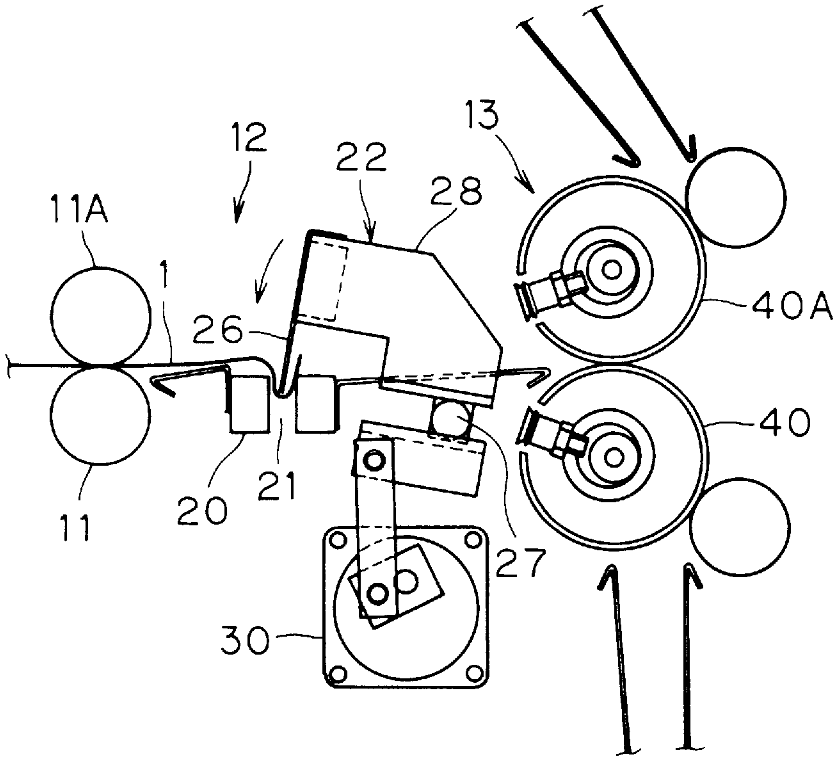
FIG. 6 illustrates another step of the separating operation by the separator for showing an intermediately separated state of a forward end portion of the composite film.
Figure 7:
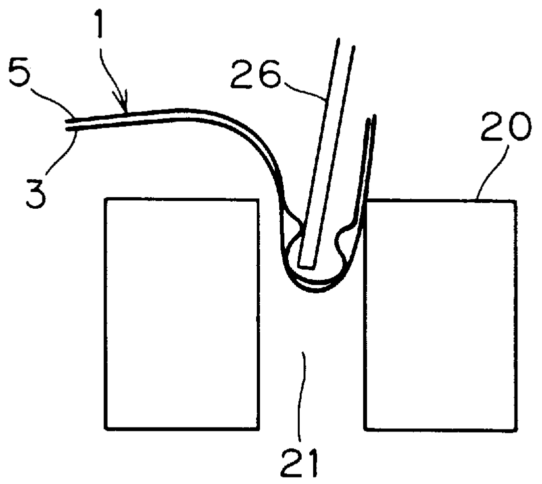
FIG. 7 illustrates the intermediately separated state of the forward end portion of the composite film.
Figure 8:
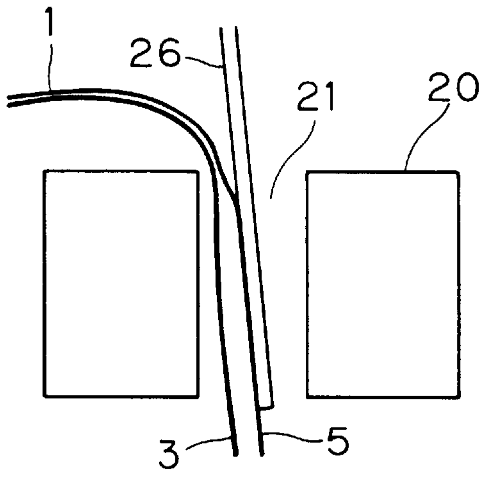
FIG. 8 illustrates a separated state of the forward end portion of the composite film.

As shown in FIG. 6, the rocking member 28 is then driven by the drive motor 30 to be rocked about the rotation axis 27, thereby downwardly moving the insertion blade 26 from a position (reference position) above the separating clearance 21 and inserting the forward end portion thereof in the separating clearance 21 while bending the forward end portion of the composite film 1. In the forward end portion of the composite film 1, the upper stripping sheet 5 is wavily bent inside the base sheet 3 which is bent in a U shape to be partially separated therefrom, as shown in FIG. 7. The separation portion spreads toward the forward end as the insertion blade 26 is further downwardly moved, and the forward end portion of the composite film 1 is suspended in the separating clearance 21 in a completely separated state when the former is completely received in the latter, as shown in FIG. 8.

Figure 9:
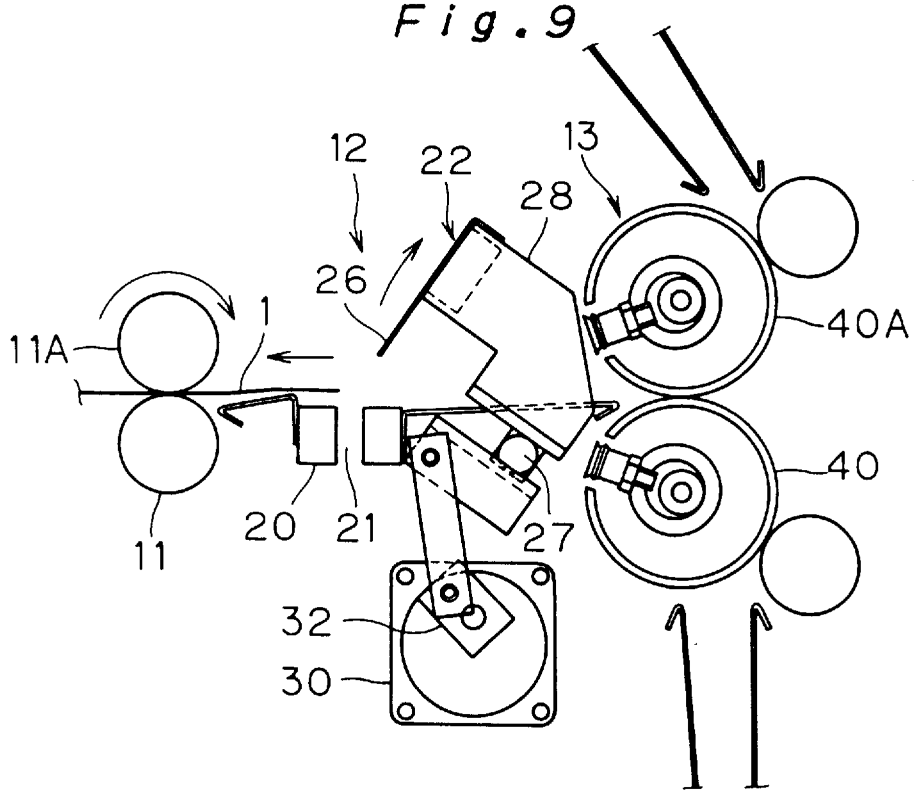
FIGS. 9 and 10 illustrate still another step of the separating operation by the separator for showing a separated state of the forward end portion of the composite film.

Thereafter the rocking member 28 is rocked to upwardly move the insertion blade 26 to the reference position, and the carrier rollers 11 and 11A are reversely rotated to pull up the forward end portion of the composite film 1 from the separating clearance 21, as shown in FIG. 9. In order to return the insertion blade 26 to the reference position, the drive motor 30 may be controlled to be stopped by detection of the reference position by the arm member 32 or the rocking member 28. In case of employing a motor such as a pulse motor capable of controlling a rotating position, its input pulse number may be controlled. As to the timing for stopping the reverse rotation of the carrier rollers 11 and 11A, the detector may detect that the forward end portion of the composite film 1 is pulled up from the separating clearance 21 for stopping the drive motor 30, or the drive motor 30 may alternatively be stopped after a prescribed time by timer control.

Figure 10:
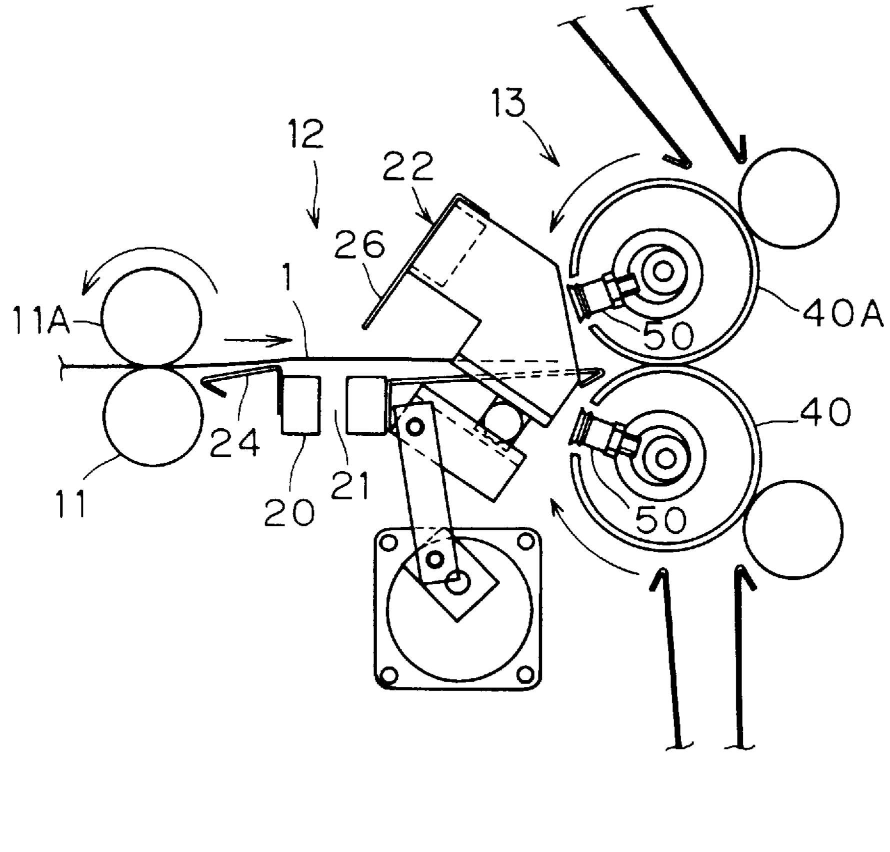

After the forward end portion of the composite film 1 is pulled up from the separating clearance 21, the carrier rollers 11 and 11A are normally rotated to carry the composite film 1 having the separated (delaminated) forward end portion toward the overall separating part 13, as shown in FIG. 10. At this time, the forward end of the composite film 1 will not enter the separating clearance 21, since a base portion of the upstream carrier guide 24 of the support 20 is set to be slightly higher than a surface of the support 20.

The forward end portion of the composite film 1 becomes delaminated due to the difference between the thicknesses of the base sheet 3 and those of the stripping sheet 5, the toughness thereof, the curvature difference between the interior and the exterior of the bent portion and the like. It has been confirmed by the inventors that excellent separation is attained not only when the stripping sheet 5 being thinner than the base sheet 3 is inside the bent portion as shown in FIG. 10 but when the base sheet 3 is inside the bent portion.

While the forward end portion of the composite film 1 is separated (delaminated), the sucker rollers 40 and 40A of the overall separating part 13 are stopped in states slightly rotated upstream from such states that the suction members 50 thereof are opposed to each other. These positions are assumed to be reference positions of the suction members 50 (refer to FIG. 9). When the forward end portion of the composite film 1 is separated, carried toward the overall separating part 13 and reaches a position close to the sucker rollers 40 and 40A as shown in FIG. 10, the vacuum electromagnetic valves are opened to evacuate the vacuum chamber 62 (see FIG. 4) provided in the pipe 53, and rotation of the sucker rollers 40 and 40A is started. A proper detector detects such reaching of the composite film 1, for controlling the vacuum electromagnetic valves and the sucker roller drive motors by its signal.

Figure 11:
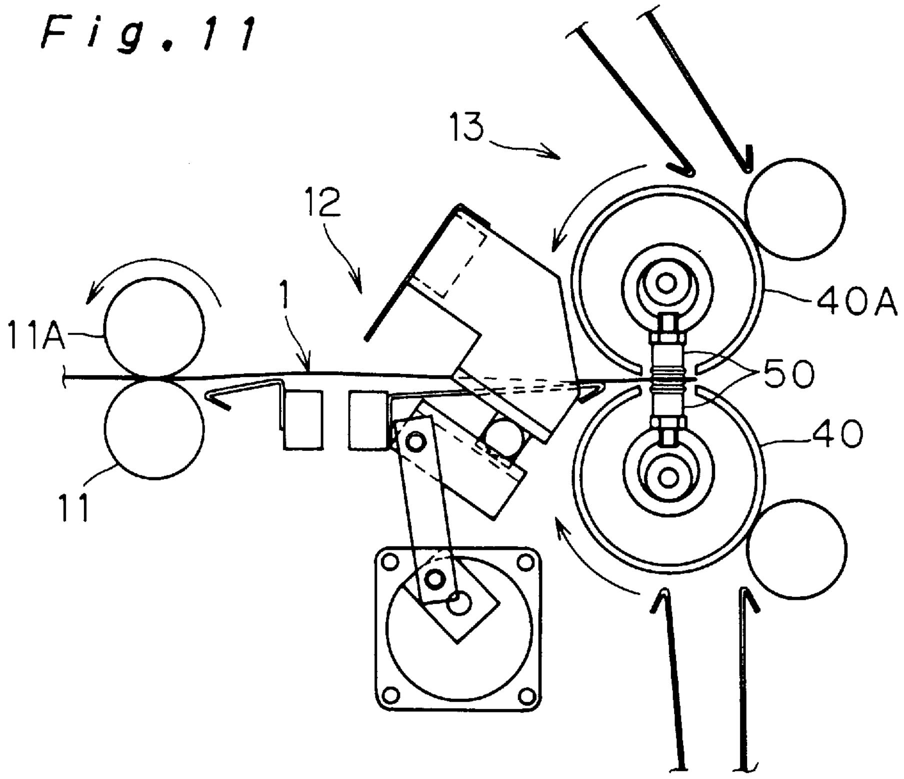
FIG. 11 illustrates a further step of the separating operation by the separator for showing a state of starting separation of the overall composite film.
Figure 12:
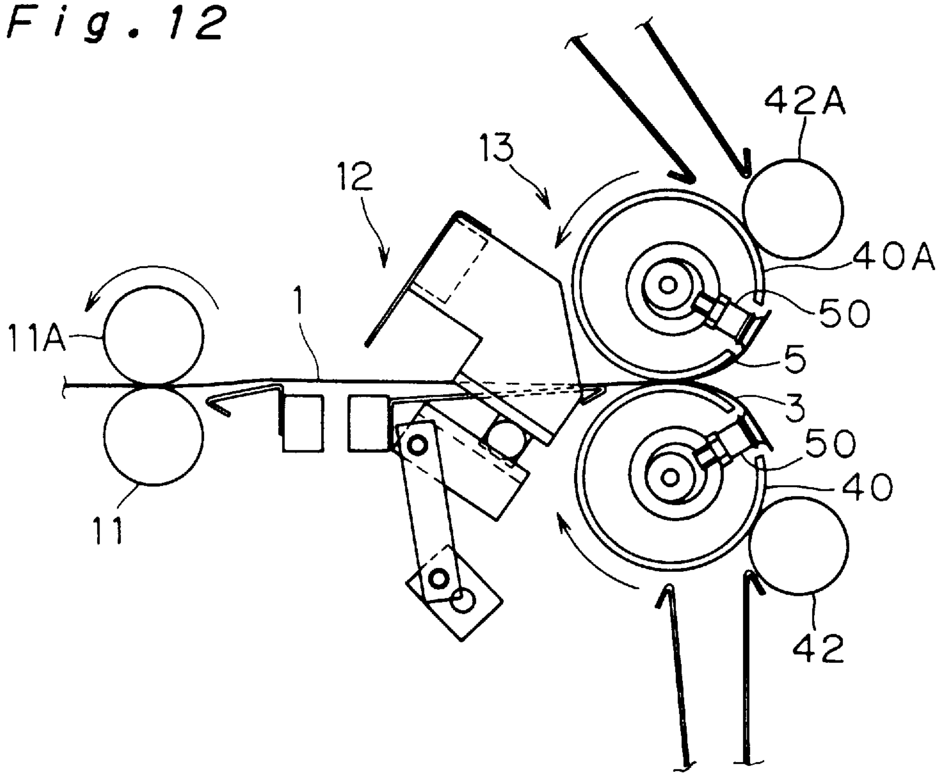
FIGS. 12 and 13 illustrate a further step of the separating operation by the separator for showing an intermediately separated state of the overall composite film.

At this time, the peripheral velocities of the sucker rollers 40 and 40A are rendered substantially identical to the speed for carrying the composite film 1, so that the forward end suction parts 55 of the suction members 50 suck/hold the respective forward end portions of the base sheet 3 and the stripping sheet 5 when the forward end portion of the composite film 1 passes through portions where the outer peripheral surfaces of the sucker rollers 40 and 40A most approach to each other, as shown in FIG. 11. Vacuum suction may be started at this point of time.

Figure 13:
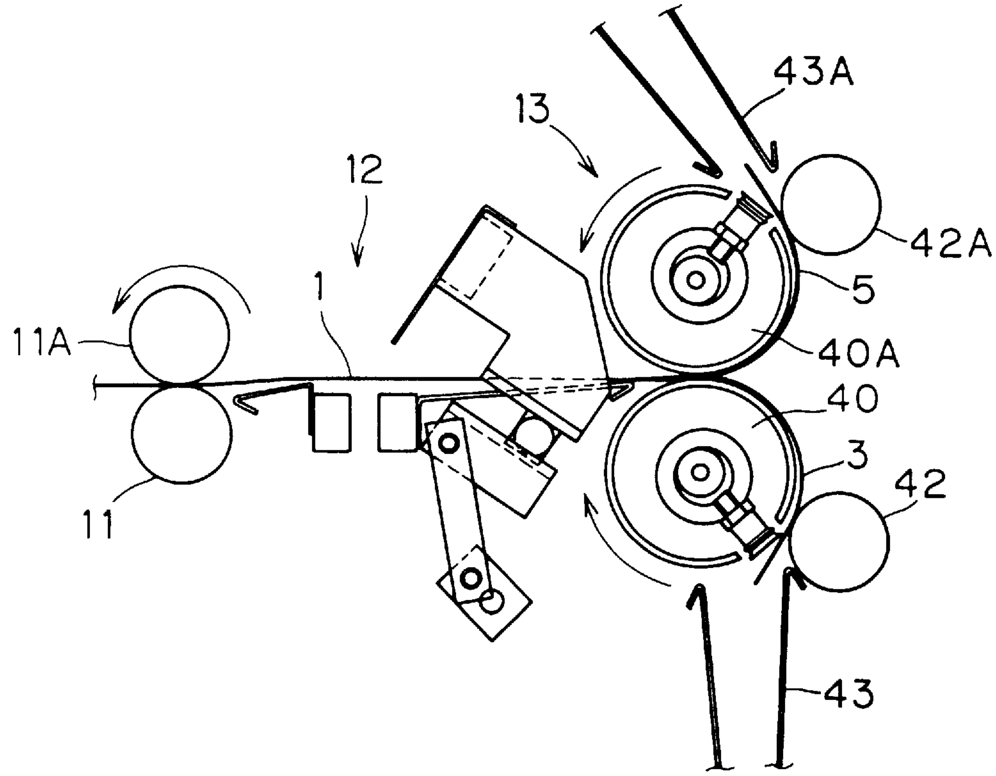

Further, the sucker rollers 40 and 40A are rotated to increase the distances between the suction members 50, whereby the base sheet 3 and the stripping sheet of the composite film 1 are separated physically from each other and carried toward the roller rotation directions, as shown in FIG. 13. After the forward end portions of the base sheet 3 and the stripping sheet 5 pass through the presser rollers 42 and 42A, the vacuum electronic valves are closed to cancel the vacuum suction. As to the timing for canceling the suction, the vacuum electromagnetic valves may be controlled by detecting that the forward end portion(s) of the base sheet 3 and/or the stripping sheet 5 pass(es) through the presser rollers 42 and 42A or rotation positions of the sucker rollers 40 and 40A by a proper detector, or by time control from starting of the rotation of the sucker rollers 40 and 40A.

The sucker rollers 40 and 40A are continuously rotated also after the suction is canceled. The stripping sheet 5 and the base sheet 3 are carried toward respective collection areas by the presser roller 42A and the sucker roller 40A and by the presser roller 42 and the sucker roller 40 respectively also after the suction of the base sheet 3 and the stripping sheet 5 is canceled, whereby the stripping sheet 5 is continuously separated from the base sheet 3 also after the suction is canceled.

After the base sheet 3 and the stripping sheet 5 are discharged to the carrier guides 43 and 43A respectively, the sucker rollers 40 and 40A are rotated toward the reference positions of the suction members 50, and stopped there to wait for carriage of a subsequent composite film 1. As to the timing for stopping the sucker rollers 40 and 40A, the movement of the sucker rollers 40 and 40A to the reference positions may be detected for stopping the drive motor 30 for the sucker rollers 40 and 40A after a proper detector detects the discharge of the base sheet 3 and/or the stripping sheet 5, or after a lapse of a prescribed time from starting of the rotation of the sucker rollers 40 and 40A.

As to another method of using the overall separating part 13, suction may be continued until the composite film 1 is completely separated along its overall length after the suction members 50 start sucking the forward end portion of the composite film 1, so that the base sheet 3 and the stripping sheet 5 are rolled up on the sucker rollers 40 and 40A respectively. The sucker rollers 40 and 40A are thereafter reversely and forward rotated to be rewound for discharging the sheets 3 and 5 toward the carrier guides 43 and 43A. In this case, the presser rollers 42 and 42A are preferably rendered rotation-drivable.

In case of setting a new composite film which is wound in the form of a film on the image recording unit, a forward end portion of the film whose outer periphery readily gets dirty is previously cut by about several 10 cm and discharged with no image recording. In this case, the cut film forward end portion may be carried to the overall separating part 13 without driving the forward end separating part 12, so that only the suction members 50 of one sucker roller 40 or 40A are driven at the time of carrying the film by the sucker rollers 40 and 40A downstream, for sucking the forward end portion of the composite film 1 by the suction members 50 and discharging the same toward the required carrier guide 43 or 43A.

The overall separating part 13 employs the sucker rollers 40 and 40A, whereby the composite film 1 can be separated simultaneously with carriage of the separated base sheet 3 and stripping sheet 5 to the prescribed directions by canceling the suction of the suction members 50, for reducing the separator in size and simplifying its structure.

<1.4 Modification>

While the insertion blade 26 is advanced into/retreated from the separating clearance 21 in the insertion mechanism part 22 of the forward end separating (delaminating) part 12 by rocking the rocking member 28 through the link mechanism 29 by rotation of the drive motor 30 in the aforementioned embodiment, the means for advancing/retreating the insertion blade 26 is not restricted to this but the insertion blade 26 may directly advanced/retreated by a fluid pressure cylinder or a rack pinion mechanism for converting rotation of a pinion to linear motion of a rack.

Figure 14:
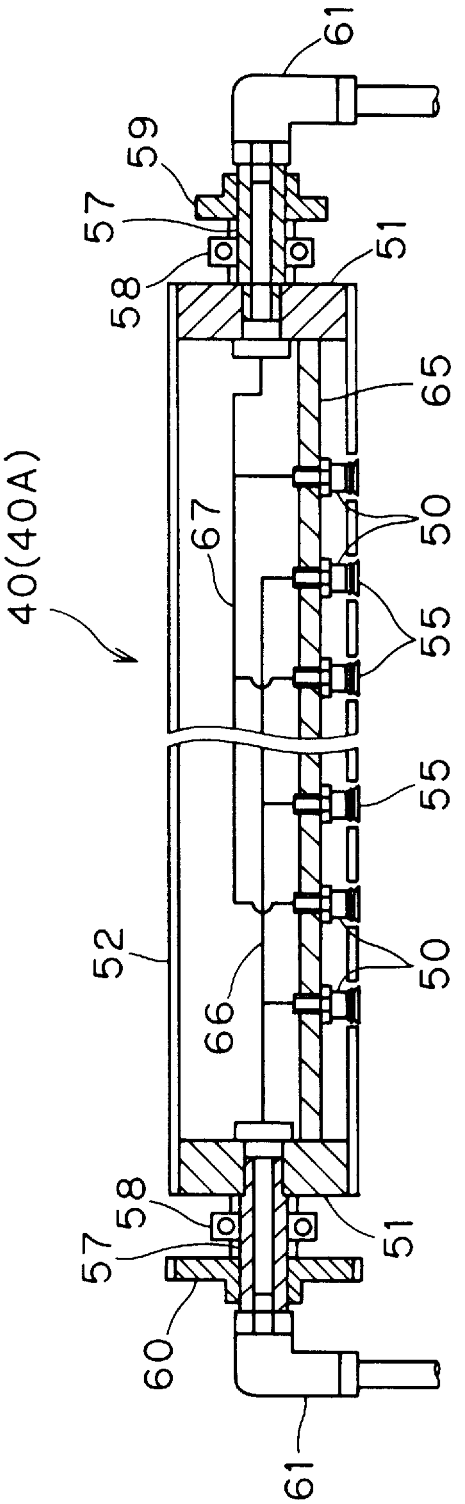
FIG. 14 is a sectional view showing another structure of the sucker roller in the separator shown in FIG. 3.

While the suction members 50 are connected to the pipe 53 provided in the roller cylinder 52 in each of the sucker rollers 40 and 40A of the overall separating part 13 in the aforementioned embodiment, such suction members 50 may alternatively be connected to a support plate 65 provided between end plates 51 so that vacuum hoses or the like may be directly piped on the suction members 50 from inlet ports of the end plates 51, as shown in FIG. 14. Piping is made from the right and left end plates 51 with two systems of intake paths 66 and 67 in the illustrated example, whereby two systems of vacuum pressures can be used and suction can be made through either or both of the intake paths 66 and 67 in response to the size and weight of the composite film 1.

While the sucker rollers 40 and 40A having the forward end suction parts 55 each provided with the plurality of circular suction members 50 along the direction of the roller axis are shown in the above embodiment, one or more suction members having forward end suction parts axially opened in the form of slits may alternatively be employed.

The separator according to the present invention is not restricted to application to the aforementioned image recording unit, but is also applicable to any type of unit which must separate a stripping sheet from a composite film formed by a base sheet and the stripping sheet separably stuck to each other regardless of presence/absence of a color material layer in the composite film. This also applies to the following embodiments.

<2. Second Embodiment>

Figure 15:
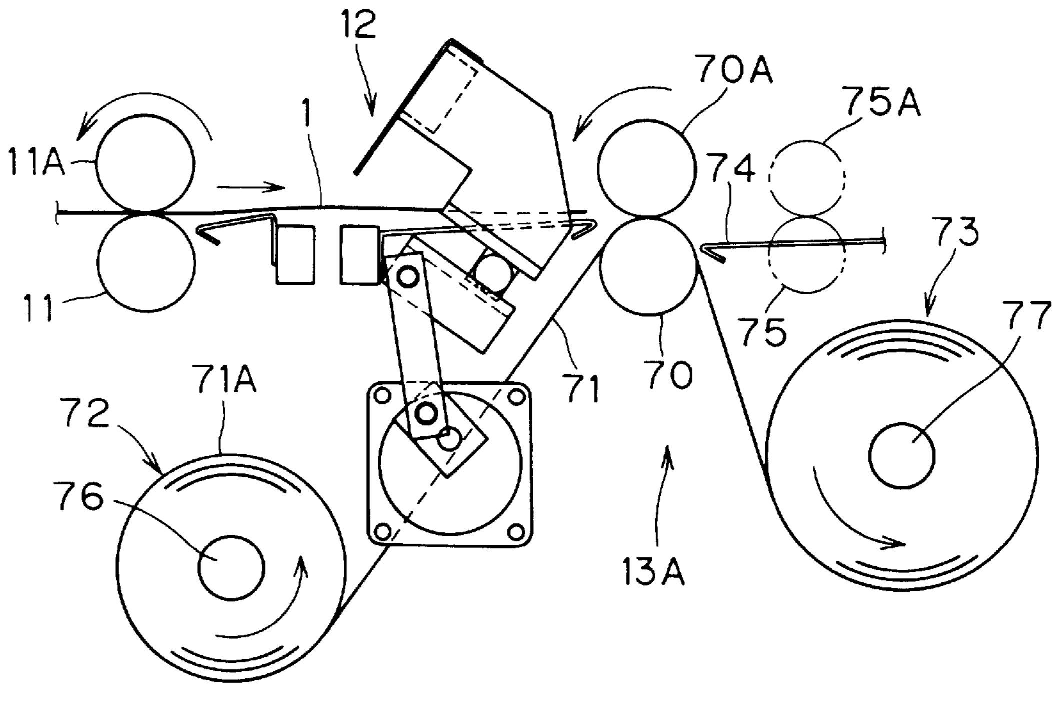
FIG. 15 illustrates the structure of a separator according to a second embodiment of the present invention for showing an unseparated state of a composite film.
Figure 16:
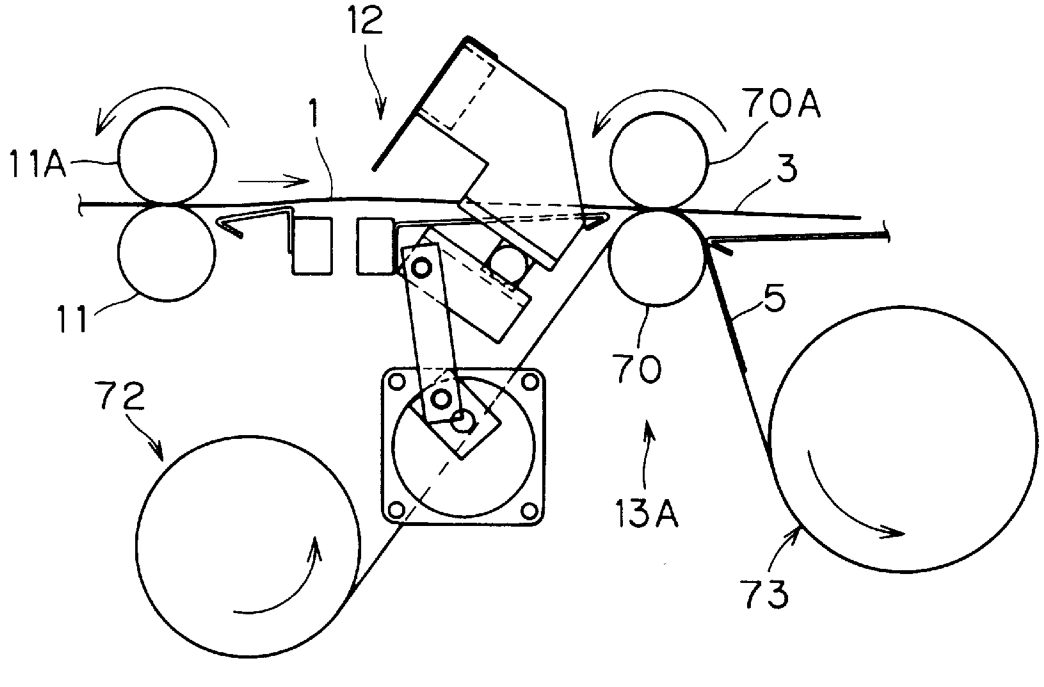
FIG. 16 illustrates the structure of the separator according to the second embodiment of the present invention for showing an intermediately separated state of the composite film.

FIG. 15 shows a separator according to a second embodiment of the present invention. Members having the same functions as those in the first embodiment are denoted by the same reference numerals. The following description is made with reference to an overall separating part, which is different from that of the first embodiment in particular.

<2.1 Structure of Overall Separating part>

An overall separating part 13A according to this embodiment comprises a pair of feed rollers 70 and 70A which are provided downstream a forward end separating part 12 for holding a composite film 1 and feeding the same downstream, tape holding means 72 for holding one or a plurality of adhesive tape rolls 71A which are wound in the form of rolls, and roll-up means 73 for rolling up an adhesive tape 71 delivered from the tape holding means 72 and wound on the feed roller 70 on a stripping sheet 5 side, while carrier guides 74 are provided downstream the feed rollers 70 and 70A. Auxiliary carrier rollers 75 and 75A may be further provided downstream the feed rollers 70 and 70A. The feed rollers 70 and 70A and the auxiliary carrier rollers 75 and 75A are similar in structure to the carrier rollers 11 and 11A.

The tape holding means 72 may be sufficiently provided with a mounting shaft 76 on which a paper tube, being a core of each adhesive tape roll 71A, can be freely rotatably mounted, for example. The roll-up means 73 may simply comprise a roll-up shaft 77 which is coupled to a proper driving source such as a torque motor, for example, and rendered torque-controllable and freely rotation-stoppable. Thereby the stripping sheet 5 on the adhesive tape 71 can be rolled around the roll-up shaft 77. When a used paper tube of the rolled composite film 1 is attached/fixed to the roll-up shaft 77, the stripping sheet 5 and the adhesive tape 71 can be discarded along with the paper tube after rolled up, and no paper tube dedicated to such rolling up is required. A plurality of adhesive tapes 71 having small widths may be provided on both side end portions as well as a central portion of the composite film 1, or a single adhesive tape 71 having a width half that of the composite film 1 may be used.

<2.2 Operation of Overall Separating part>

The operation of the overall separating part 13 according to this embodiment is described.

Until the composite film 1 whose forward end portion is separated by the forward end separating part 12 reaches a position close to upstream sides of the feed rollers 70 and 70A, the feed rollers 70 and 70A wait in states receiving the adhesive tape 71. When the composite film 1 reaches a prescribed position, driving of the feed rollers 70 and 70A and the roll-up means 73 is started, as shown in FIG. 15.

When the forward end portion of the composite film 1 is fed between opposite portions of the feed rollers 70 and 70A and held therebetween, the stripping sheet 5 adheres to the adhesive tape 71 and is guided to a direction which is different from that for carrying the composite film 1, to be separated from a base sheet 3 and rolled around the roll-up shaft 77 along with the adhesive tape 71. On the other hand, the base sheet 3 is carried downstream, to be held between the auxiliary carrier rollers 75 and 75A and carried if the same are provided. Due to such an operation, the composite film 1 is separated along the overall range.

After it is confirmed that the base sheet 3 or the stripping sheet 5 is discharged from the feed rollers 70 and 70A, the driving of the feed rollers 70 and 70A and the roll-up means 73 is stopped to wait until a subsequent composite film 1 is carried. The stripping sheet 5 rolled up by the roll-up means 73 through the adhesive tape 71 can be removed from the roll-up shaft 77 and discarded as such when reaching a prescribed roll-up diameter. According to this overall separating part 13A, the stripping sheet 5 can be readily collected and discarded simultaneously with separation of the composite film 1, whereby no large space area is required for collecting the stripping sheet 5.

<3. Third Embodiment>

Figure 17:
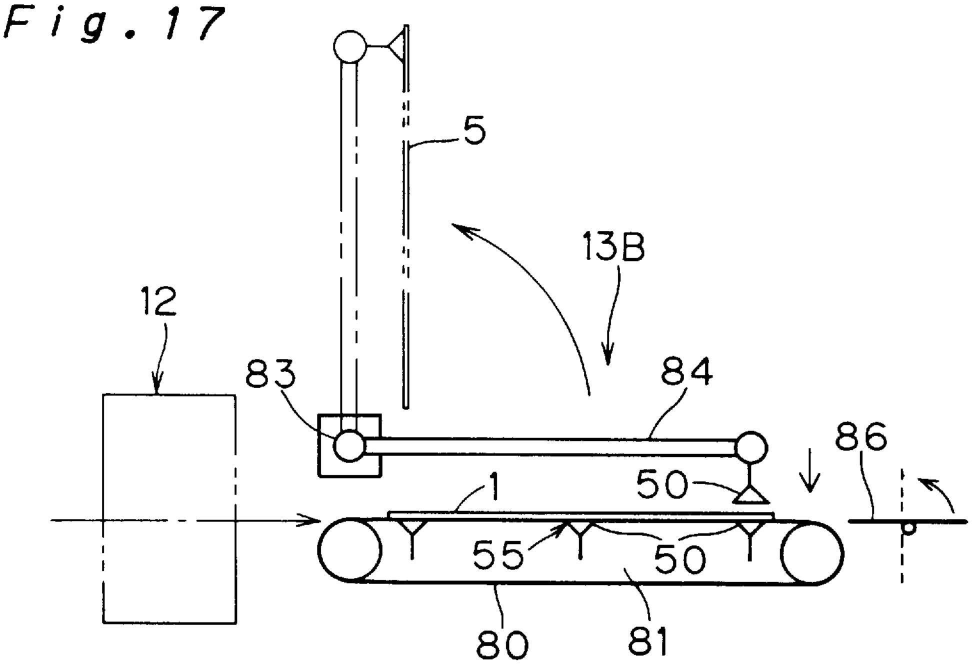
FIG. 17 illustrates the structure of an overall separating part according to a third embodiment of the present invention.

Since respective sheets of the overall composite film 1 can be readily separated after its forward end portion is separated, the overall separating part is not restricted to those of the aforementioned embodiments but its structure can be selected from various ones. As shown in FIG. 17, an overall separating part 13B of a separator according to a third embodiment of the present invention comprises a carrier conveyor 81 which is provided downstream a forward end separating part 12 and has a plurality of trains of carrier belts 80, and a separating arm 84 having a rotary shaft 83 on a portion above an upstream end portion of the carrier conveyor 81. A number of suction members 50 are provided on a forward end portion of the separating arm 84 along the conveyor width to be opposed to a downstream end portion of the carrier conveyor 81. Further, a plurality of suction members 50 are arranged between the carrier belts 80, so that forward end suction parts 55 thereof are exposed on surfaces of the carrier belts 80.

According to this separator, a composite film 1 whose forward end portion is separated by the forward end separating part 12 is carried downstream by the carrier conveyor 81, and this carriage is stopped when the forward end portion of the composite film 1 reaches the downstream end portion of the carrier conveyor 81 while the suction members 50 provided on the carrier conveyor 81 side vacuum-suck a lower surface of the composite film 1, i.e., a base sheet 3. The separating arm 84 is rotated toward the composite film 1 and then oppositely rotated after the suction members 50 provided on its forward end portion suck an upper surface of the forward end portion of the composite film 1, i.e., a stripping sheet 5, whereby the distances between the suction members 50 of the separating arm 84 and the carrier conveyor 81 are increased for separating the stripping sheet 5 from the base sheet 3.

Thereafter the suction of the suction members 50 provided on the carrier conveyor 81 side is canceled to start the carrier conveyor 81, for carrying the base sheet 3 downstream. After the base sheet 3 is discharged from the carrier conveyor 81, the carrier conveyor 81 is stopped and the separating arm 84 is returned to a position before the separation for canceling the suction, whereby the stripping sheet 5 is placed on the carrier conveyor 81 and carried downstream due to re-starting of the carrier conveyor 81. A branch guide 86 can be provided downstream the carrier conveyor 81 for carrying the base sheet 3 and the stripping sheet 5 to prescribed areas respectively by switching the direction of this branch guide 86.

<4. Fourth Embodiment>

Figure 18:
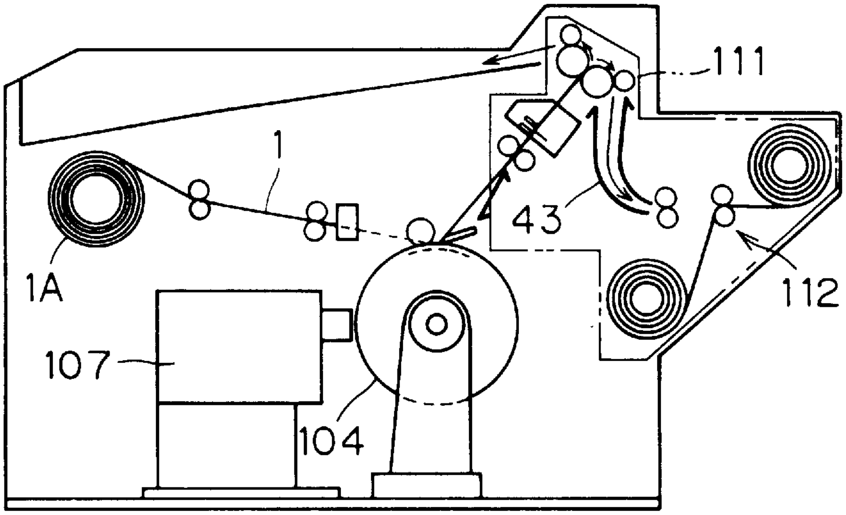
FIG. 18 schematically illustrates the structure of a process image recording unit having a separator according to a fourth embodiment of the present invention.

FIG. 18 shows a separator 111 for an image recording unit according to a fourth embodiment of the present invention, which is similar to that according to the first embodiment and provided with a collection part 112 for collecting a stripping sheet 5. While the stripping sheet 5 is collected by the adhesive tape 71 simultaneously with overall separation in the second embodiment, a part for collection is mounted as a separate unit in this embodiment. Therefore, description is omitted as to remaining portions of the separator 111 which are similar to those of the first embodiment, and only the sheet collection part 112 is described. While the stripping sheet 5 separated in the overall separating part 13 of the separator 111 is fed to the carrier guides 43 and 43A in the first embodiment, carrier guides 43 are curved in this embodiment as shown in FIG. 18, so that the stripping sheet 5 is horizontally guided to the sheet collection part 112.

<4.1 Structure of Sheet Collection Part>

Figure 19:
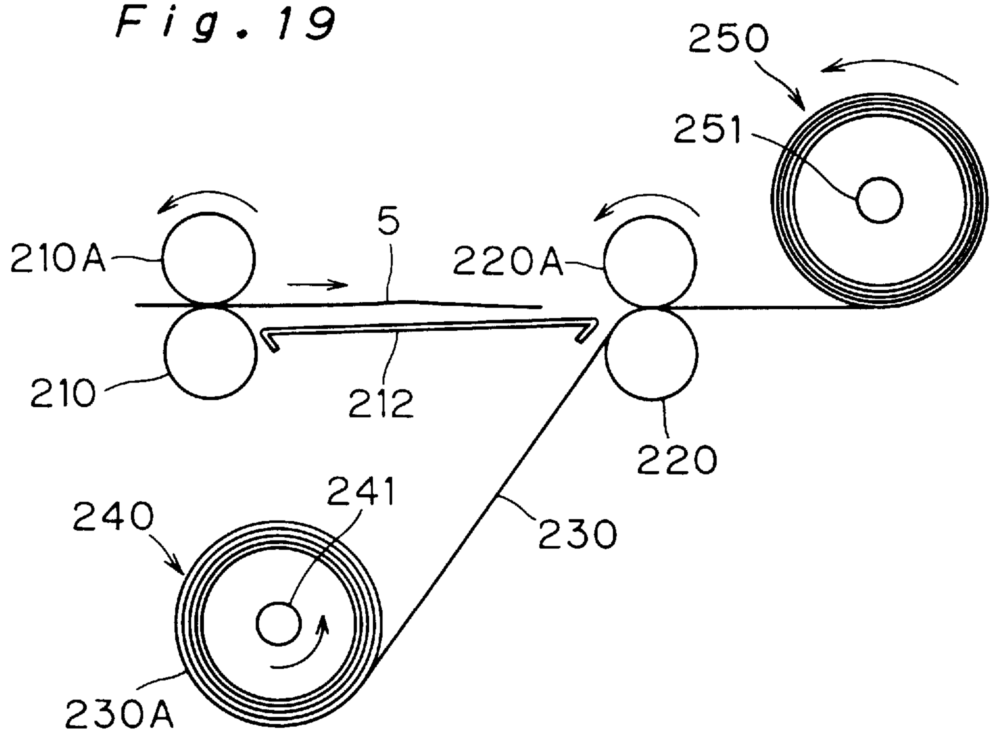
FIGS. 19, 20, and 21 illustrate respective states of a series of operations for collecting a sheet in the separator according to the fourth embodiment of the present invention.

As shown in FIG. 19, the sheet collection part 112 comprises a pair of upper and lower carrier rollers 210 and 210A for holding the stripping sheet 5 between roller opposite portions and feeding the same downstream, a pair of carrier rollers 220 and 220A provided downstream the carrier rollers 210 and 210A through carrier guides 212 respectively, holding means 240 for rewindably holding an adhesive sheet roll 230A which is wound in the form of a roll, and roll-up means 250 for rolling up the stripping sheet 5 through an adhesive sheet 230 delivered from the adhesive sheet roll 230A held by the holding means 240 and wound on the lower carrier roller 220. The carrier rollers 220 and 220A hold the stripping sheet 5 through the adhesive sheet 230 which is wound on the lower carrier roller 220 and carrying the stripping sheet 5 toward the roll-up means 250 along with the adhesive sheet 230 while supporting a lower surface of the stripping sheet 5 by the adhesive sheet 230.

A set position of a rotation axis of one (lower in the figure) carrier roller 210 is fixed while a rotation axis of the other carrier roller 210A is rendered radially movable with respect to the fixed carrier roller 210 in the illustrated plane and urged against the fixed carrier roller 210 by a spring or its own weight, so that the carrier rollers 210 and 210A can hold the stripping sheet 5 between outer peripheral surface opposite portions thereof. The fixed carrier roller 210 is rotation-stoppably driven by a drive motor, and the other carrier roller 210A is slaved/rotated through the stripping sheet 5 in this case.

In order to further reliably carry the composite film 1, toothed gears or belt transmission members may be provided on the carrier rollers 210 and 210A for transmitting rotation from the driving carrier roller 210 to the driven carrier roller 210A. The outer peripheral surfaces of the carrier rollers 210 and 210A may be covered with lining layers of a material such as rubber having a large coefficient of friction. The carrier rollers 220 and 220A are similar in structure to the carrier rollers 210 and 210A.

The adhesive sheet 230 can be prepared from a long strip-shaped member such as a tape, thread or a film-like wrap member provided with an adhesive layer along its overall surface, and if its width is narrow, about two or three ones are arranged in parallel with each other along the direction of carriage to support both side ends of the stripping sheet 5, preferably along with its central portion. If the width of the adhesive sheet 230 is about half that of the stripping sheet 5, on the other hand, a single one may be employed for supporting the central portion of the stripping sheet 5.

In case of employing an adhesive tape as the adhesive sheet 230, the same is wound on one of the carrier rollers 220 and 220A so that its adhesive surface is stuck to the stripping sheet 5, as a matter of course. When an adhesive tape is employed, the carriage state is stabilized and the roll-up is also advantageously extremely stabilized, regardless of the carriage direction.

The holding means 240 may be sufficiently provided with a mounting shaft 241 on which a paper tube, being a core of each adhesive sheet roll 230A, can be freely rotatably mounted. The roll-up means 250 may simply comprise a roll-up shaft 251 which is coupled to a proper driving source such as a torque motor, for example, and rendered torque-controllable and freely rotation-stoppable. The adhesive sheet 230, or the adhesive sheet 230 and the stripping sheet 5 supported by the same, are rolled-up on the roll-up shaft 251 in response to the amount of delivery from the carrier rollers 220 and 220A. In general, a disposable paper tube is mounted on the roll-up sheet 251 as a core in roll-up. When a used paper tube of a roll film for image recording is employed as a disposable tube, for example, the stripping sheet 5 can be discarded as such along with the paper tube, and no dedicated paper tube for roll-up is required.

<4.2 Operation of Sheet Collection Part>

The operation of the sheet collection part 112 is now described.

Until the stripping sheet 5 is carried by the carrier rollers 210 and 210A and reaches a position close to an upstream side of the carrier rollers 220 and 220A, the carrier rollers 220 and 220A wait in states receiving the adhesive sheet 230. A forward end of the adhesive sheet 230 wound on the lower carrier roller 220 is fixed to a core (paper tube) mounted on the roll-up shaft 251 of the roll-up means 250, and the adhesive sheet 230 is in a state which can be rolled-up on the roll-up means 250.

When the stripping sheet 5 reaches a prescribed position, the carrier rollers 220 and 220A and the roll-up means 250 are so rotated that the adhesive sheet 230 is delivered from the holding means 240 and rolled-up on the roll-up means 250. A detector such as a photosensor detects such reaching of the stripping sheet 5, for controlling drive motors for the carrier rollers 210 and 210A and the roll-up means 250 by its detection signal.

Figure 20:
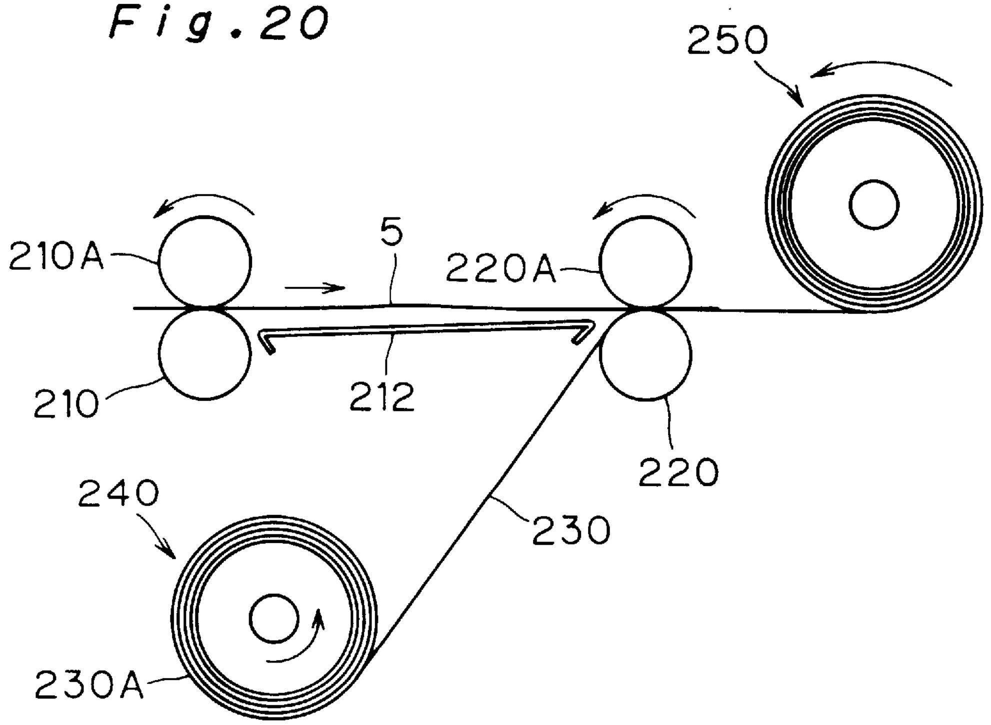
Figure 21:
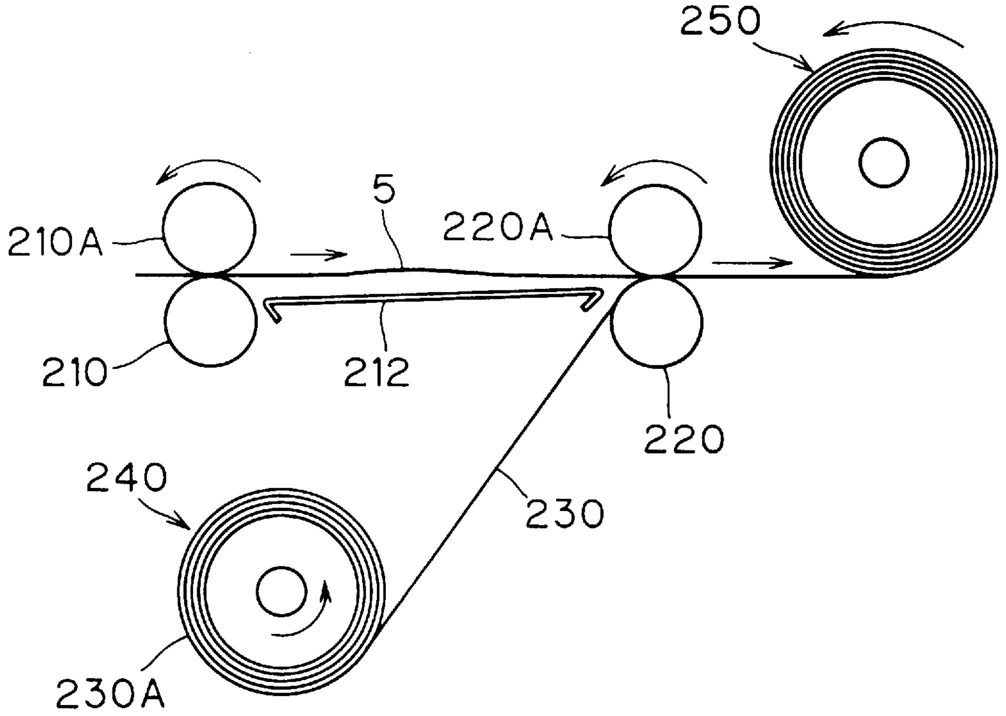

When a forward end of the stripping sheet 5 is fed between roller opposite portions of the carrier rollers 220 and 220A and held therebetween, the stripping sheet 5 is carried toward the roll-up means 250 along with the adhesive sheet 230 at the same speed while its lower surface is supported by the adhesive sheet 230 as shown in FIG. 20, to be smoothly rolled-up on the roll-up means 250 as shown in FIG. 21.

After the stripping sheet 5 is rolled-up, driving of the carrier rollers 210 and 210A and the roll-up means 250 is stopped to wait in this state until a subsequent stripping sheet 5 is carried. As to the timing for stopping the driving, a detector may detect that the stripping sheet 5 is discharged from the carrier rollers 210 and 210A, or the drive motors may be controlled through an elapsed time from starting of the rotation of the carrier rollers 210 and 210A.

The stripping sheet 5 rolled-up on the roll-up means 250 through the adhesive sheet 230 can be removed from the roll-up shaft 251 and discarded as such when reaching a prescribed roll-up diameter. According to this collection part 112, a number of discontinuously carried stripping sheets 5 can be successively rolled-up through the adhesive sheet 230, whereby the stripping sheets 5 can be reliably, readily and compactly rolled-up to be also readily collected and discarded, while no large space area is required for collecting the stripping sheets 5.

In case of employing an adhesive sheet having a shorter width than the target sheet to be collected and the target sheet is adhesively fixed to the adhesive sheet outside a necessary region (an image formation region in a photographic film or the like), the necessary region is not damaged by roll-up collection, and hence the present invention is also applicable to collection of a sheet (e.g., a base sheet 3) other than a stripping sheet by employing this sheet collection part 112.

<5. Fifth Embodiment>

<5.1 Structure of Sheet Collection Part>

Figure 22:
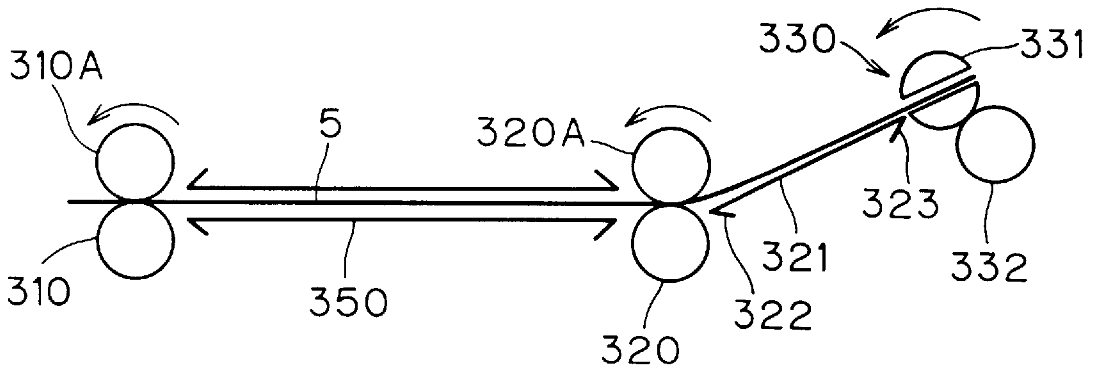
FIGS. 22 and 24, 25, 26, and 27 illustrate respective states of a series of operations for collecting a sheet in a separator according to a fifth embodiment of the present invention.

FIG. 22 illustrates a sheet collection part of a separator according to a fifth embodiment of the present invention. Only the sheet collection part is different as compared with the separator according to the fourth embodiment. Therefore, description is omitted as to other portions of the separator which are similar to those of the first embodiment, and only the sheet collection part is described.

As shown in FIG. 22, the sheet collection part according to this embodiment comprises a pair of upper and lower first carrier rollers 310 and 310A and a pair of upper and lower second carrier rollers 320 and 320A for holding a stripping sheet 5 therebetween and carrying the same downstream, and roll-up means 330 provided downstream the second carrier rollers 320 and 320A through movable guides 321, while a rotary guide 350 is provided between the first carrier rollers 310 and 310A and the second carrier rollers 320 and 320A for superposing a forward end portion of a subsequent stripping sheet 5 (hereinafter referred to as a subsequent stripping sheet 5B) on a rear end superposition part W (see FIG. 26) of a precedent stripping sheet 5 (hereinafter referred to as a precedent stripping sheet 5A). Superposition of these stripping sheets 5 is described later with reference to FIG. 26. The movable guide 321 is structured to be rotatable about a rear end part 322, while its forward end part 323 is urged against a roll-up shaft 331 by a spring or the like. The distance between each of the second carrier rollers 320 and 320A and the roll-up means 330 is set to be shorter than the superposition allowance for the precedent and subsequent stripping sheets 5A and 5B, so that the rear end portion of the precedent stripping sheet 5A is held between the second carrier rollers 320 and 320A when the forward end portion of the subsequent stripping sheet 5B is rolled-up on the roll-up means 330.

Set positions of rotation axes of single (lower in the figure) carrier rollers 310 and 320 are fixed while rotation axes of the other carrier rollers 310A and 320A are rendered radially movable with respect to the fixed carrier rollers 310 and 320 in the illustrated plane and urged against the fixed carrier rollers 310 and 320 by springs or own weight thereof, so that the stripping sheets 5 can be held between the first carrier rollers 310 and 310A and the second carrier rollers 320 and 320A. The fixed carrier rollers 310 and 320 are rotation-stoppably driven by drive motors, and the other carrier rollers 310A and 320A are slaved/rotated through the stripping sheets 5 in this case. The first carrier rollers 310 and 310A and the second carrier rollers 320 and 320A are rotated/driven at the same peripheral velocity.

In order to further reliably carry the stripping sheets 5, toothed gears or belt transmission members may be provided on the carrier rollers 310, 310A, 320 and 320A for transmitting rotation from driving carrier rollers (the first carrier rollers 310 and 310A and the second carrier rollers 320 and 32()A are simply referred to as carrier rollers when the same are not particularly distinguished from each other) to the driven carrier rollers. Further, outer peripheral surfaces of the carrier rollers may be covered with lining layers of a material such as rubber having a large coefficient of friction.

The roll-up means 330 comprises a roll-up shaft 331 which is transmission-coupled with a torque motor and rendered freely rotation-stoppable, and a presser roller 332 for holding the stripping sheet 5 rolled up on the roll-up shaft 331 side between the same and the roll-up shaft 331, which is radially approachably/separably urged against the roll-up shaft 331 or a collected sheet roll 305A (see FIG. 24) rolled up on the roll-up shaft 331. An outer peripheral surface of the presser roller 332 may be covered with a lining layer of a material such as rubber for preventing slippage, similarly to the carrier rollers.

Figure 23A:
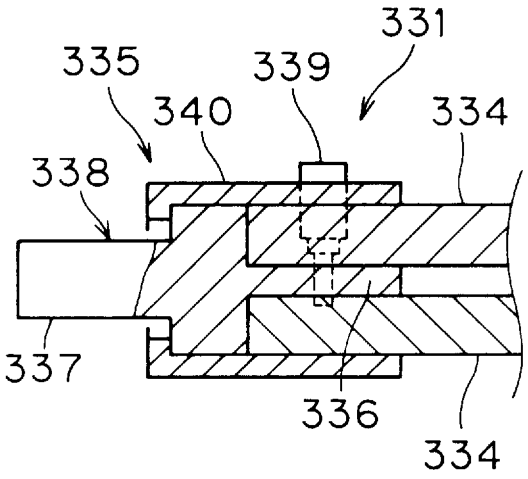
FIGS. 23A and 23B are a left side elevational view and a front elevational view showing the structure of roll-up means of a sheet collection part of the separator according to the fifth embodiment of the present invention.
Figure 23B:
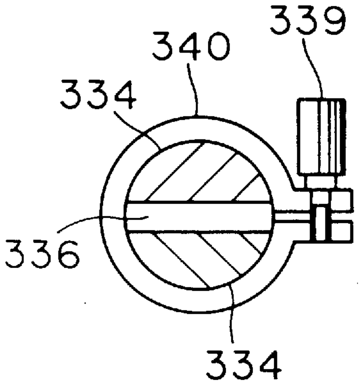

As shown in FIGS. 23A and 23B which are a left side elevational view and a front elevational view respectively, the roll-up shaft 331 comprises a pair of roll-up spools 334 having arcuate sections and a roll-up spool fixing member 335 oppositely arranging the roll-up spools 334 to be freely assembleable/disassembleable through a prescribed clearance. The roll-up spool fixing member 335 comprises a shaft end member 338 having a clearance regulating part 336 which is so inserted between the roll-up spools 334 that outer peripheral surfaces thereof form parts of a cylindrical surface and a shaft part 337 which is connected to a rotation driving source, a sleeve 340 mounted on the shaft end member 338 and the roll-up spools 334, and a fixed screw member 339 for fixing the sleeve 340. The sleeve 340 is provided with a split groove to be detachably mounted on the shaft end member 338 and the roll-up spools 334, and the fixed screw member 339 is so fastened as to integrate these members with each other. When the fixed screw member 339 is loosened, the sleeve 340 is removed and the shaft end member 338 is axially extracted from between the roll-up spools 334, on the other hand, the distance between the roll-up spools 334 can be reduced for reducing the outward form composed of the roll-up spools 334.

Upper and lower surfaces of the rotary guide 350 provided between the first carrier rollers 310 and 310A and the second carrier rollers 320 and 320A are formed by guide plates with respect to the sheet carriage direction and a rotation axis (not shown) is provided on a central portion of the rotary guide 350, so that the rotary guide 350 is rotatable/ stoppable about the rotation axis by rotation driving means such as a drive motor, and rendered position-holdable in a stopped position.

<5.2 Operation of Sheet Collection Part>

The operation of this sheet collection part is now described.

In case of rolling up a first sheet, the first carrier rollers 310 and 310A and the second carrier rollers 320 and 320A are rotated, so that a forward end portion of the stripping sheet 5 carried from the first carrier rollers 310 and 310A through the rotary guide 350 is discharged from the second carrier rollers 320 and 320A and thereafter carried to a clearance between the roll-up spools 334 of the roll-up shaft 331. As shown in FIG. 22, the stripping sheet 5 is discharged by the first carrier rollers 310 and 310A and the second carrier rollers 320 and 320A while the roll-up sheet 331 is rotated to roll up the stripping sheet 5. At this time, the roll-up sheet 331 which is torque-controlled by a torque motor is rotation-stopped when torque exceeding prescribed torque is applied thereto, and the stripping sheet 5 is rolled-up in response to the amount of delivery from the second carrier rollers 320 and 320A.

Figure 24:
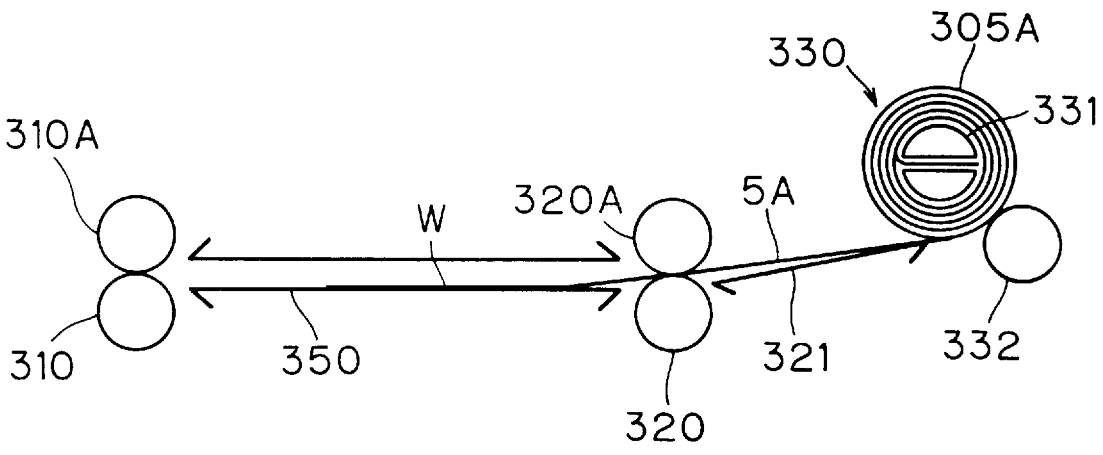
Figure 25:
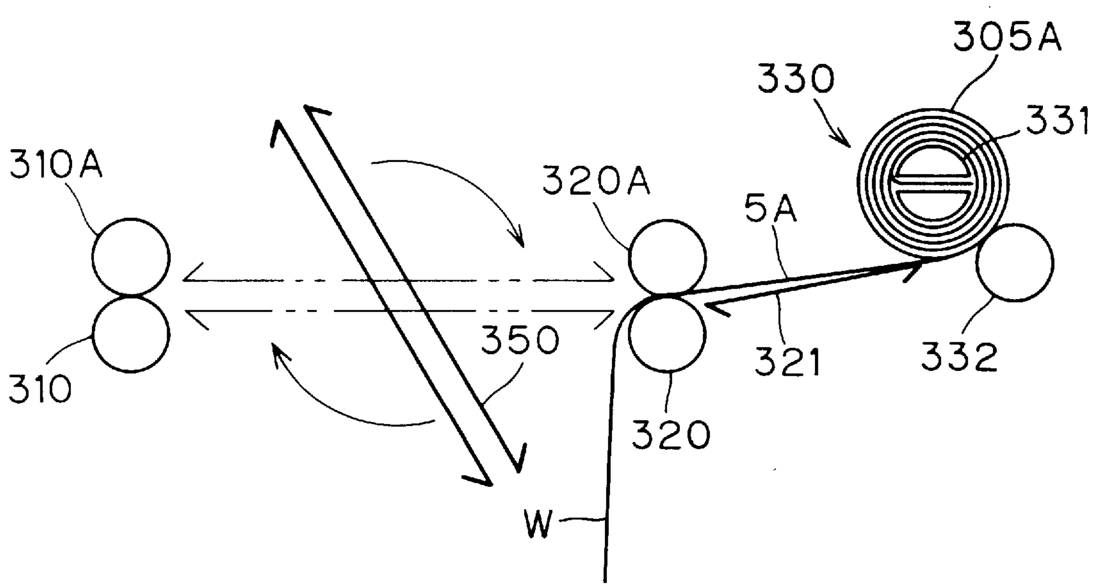

The rotation of the first carrier rollers 310 and 31()A and the second carrier rollers 320 and 320A is stopped at a point of time when the rear end of the precedent stripping sheet 5A passes through the first carrier rollers 310 and 310A and the rear end superposition part W of the precedent stripping sheet 5A remains in the rotary guide 350 as shown in FIG. 24, and then the rotary guide 350 is rotated by about 180°, as shown in FIG. 25. At this time, the rear end superposition part W of the precedent stripping sheet 5A remaining in the rotary guide 350 is suspended from the second carrier rollers 320 and 320A. As to the timing for stopping the first carrier rollers 310 and 310A and the second carrier rollers 320 and 320A, a proper detector such as a photosensor may detect the point of time when the rear end of the precedent stripping sheet 5A passes through the first rollers 310 and 310A for stopping the driving of the carrier rollers after a lapse of a prescribed time so that the superposition part W of the precedent stripping sheet 5A remains in the rotary guide 350.

Figure 26:
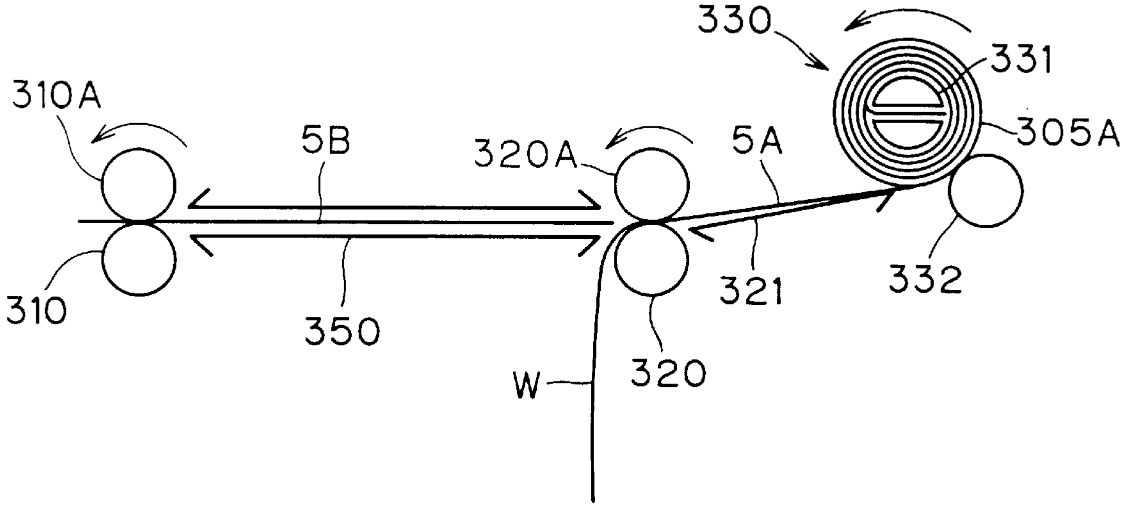

The second carrier rollers 320 and 320A wait in this state, while the first carrier rollers 310 and 310A hold the subsequent stripping sheet 5B and feed the same into the rotary guide 350, and when the forward end of the subsequent stripping sheet 5B reaches the second carrier rollers 320 and 320A, the second carrier rollers 320 and 320A are rotated for carrying the stripping sheets 5A and 5B while superposing the forward end portion of the subsequent stripping sheet 5B on the rear end superposition part W of the precedent stripping sheet 5A between the second carrier rollers 320 and 320A, as shown in FIG. 26. Namely, the rear end superposition part W of the precedent stripping sheet 5A passing through the rotary guide 350 is taken out from the rotary guide 350 due to the rotation thereof, so that the rotary guide 350 is positioned on the roll-up shaft 331 side (the roll-up shaft 331 side in case of being rolled-up) of the rear end superposition part W.

Figure 27:
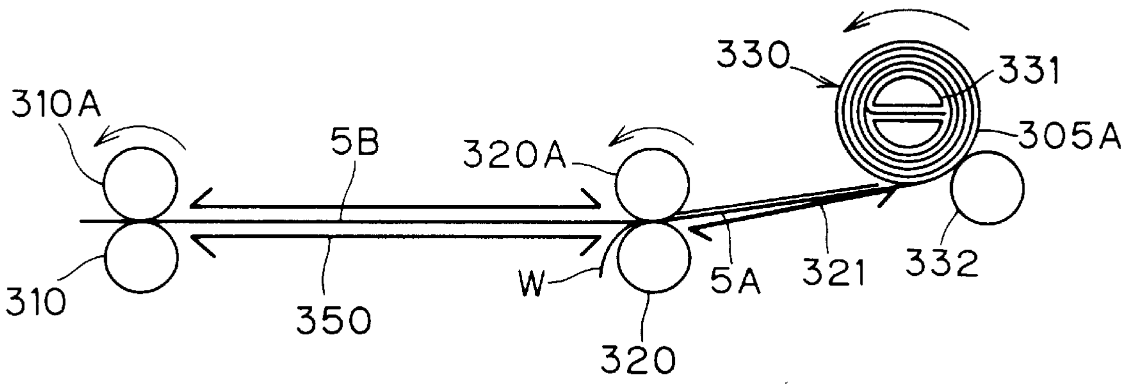

As the rear end superposition part W of the precedent stripping sheet 5A discharged from the second carrier rollers 320 and 320A is rolled-up, the subsequent stripping sheet SB is carried toward the roll-up means 330, and rolled-up in such a state that its forward end is superposed on an inner side (roll-up shaft side) of the rear end superposition part W of the precedent stripping sheet 5A, as shown in FIG. 27. At this time, a portion close to the rear end of the precedent stripping sheet 5A is still held between the second carrier rollers 320 and 320A, and the roll-up shaft 331 is not idled.

When the subsequent stripping sheet 5B is rolled up and the state shown in FIG. 24 is attained again, the rotation of the first carrier rollers 310 and 310A and the second carrier rollers 320 and 320A is stopped, and thereafter following sheets are continuously rolled-up and a similar roll-up operation is repeated until the collected sheet roll 305A reaches a prescribed roll-up outer diameter.

The maximum roll-up outer diameter of the collected sheet roll 305A is preferably set at such a dimension that a portion of a single sheet excluding a superposition part defines an outer peripheral length of a rolled-up sheet, so that a part of the rolled-up sheet is regularly held by the presser roller 332 between the same and the outer peripheral surface of the collected sheet roll 305A, and the sheet can be stably rolled-up. A proper roll-up guide may be arranged on the outer peripheral portion of the collected sheet roll 305A, as a matter of course. A detector for detecting the maximum outer diameter of the collected sheet roll 305A may be provided for displaying collection of the collected sheet roll 305A or stopping the roll-up by its detection signal. The number of rolled-up sheets may be counted for displaying collection when the number reaches that of sheets which can be rolled-up.

When the rolled-up sheets rolled around the roll-up shaft 331 reach the maximum outer diameter, the rear end superposition part of the final sheet is fixed to the outer peripheral surface of the rolled-up sheets by an adhesive tape or the like, so that connection of a rotation driving part to the roll-up shaft 331 is canceled and the rolled-up sheets are removed from the roll-up means 330 along with the roll-up shaft 331. The sleeve 340 and the shaft end member 338 (see FIG. 23) are removed, whereby the roll-up spools 334 are approachable to a central side, and can be readily drawn out from the central portion of the rolled-up sheets.

Figure 28:
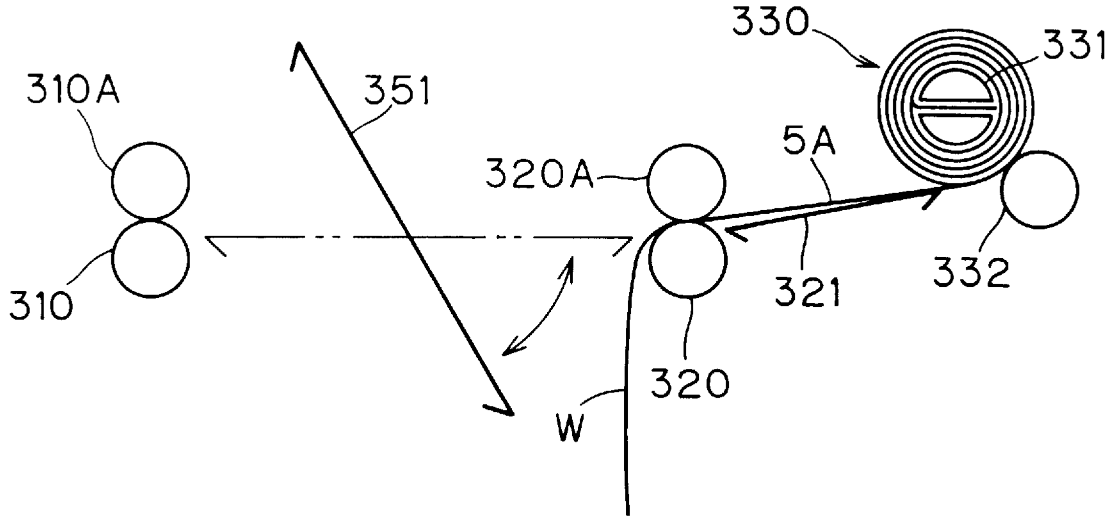
FIG. 28 illustrates another mode of the sheet collection part of the separator according to the fifth embodiment of the present invention.

As shown in FIG. 28, a rocking guide 351 which has a guide plate only on its lower surface and is rocked about its central portion may be employed for discharging the rear end superposition part W of the precedent stripping sheet 5A placed on the rocking guide 351 by downwardly rocking a right end portion of the rocking guide 351 in FIG. 28.

While the second carrier rollers 320 and 320A and the roll-up means 330 are so arranged that the distance therebetween is smaller than the length of the superposition part W in the aforementioned embodiment for holding the rear end of the rear end superposition part W of the precedent stripping sheet 5A between the second carrier rollers 320 and 320A when the forward end of the subsequent stripping sheet 5B is rolled up as shown in FIG. 27 in order to prevent idling of the roll-up shaft 331 which is driven by the torque motor, no problem arises even if the rear end of the precedent stripping sheet 5A is discharged from the second carrier rollers 320 and 320A before the forward end of the subsequent stripping sheet 5B is rolled-up, if the rotation number of the roll-up shaft 331 is so controlled that the roll-up speed of the roll-up shaft 331 is identical to the sheet carriage speed of the first carrier rollers 310 and 310A and the second carrier rollers 320 and 320A. As to the rotation number control of the roll-up shaft 331, a rotation number detector may be provided on the presser roller 332 for controlling the rotation number of the drive motor for the roll-up shaft 331 so that the peripheral velocity of the presser roller 332 coincides with the carriage speed of the first carrier rollers 310 and 310A and the second carrier rollers 320 and 320A.

<6. Sixth Embodiment>

Figure 29:
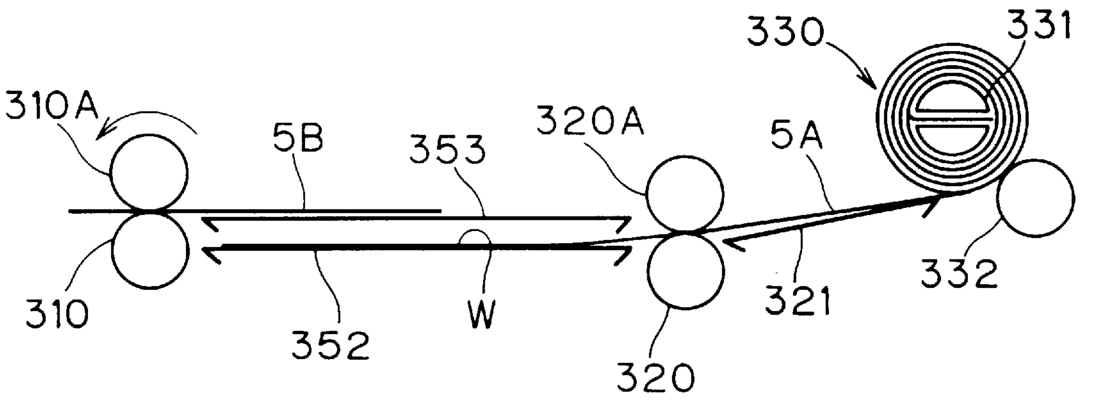
FIGS. 29 and 30 illustrate respective states of a series of operations of a sheet collection part in a separator according to a sixth embodiment of the present invention.

FIG. 29 shows a sheet collection part of a further mode provided on a separator according to a sixth embodiment of the present invention. Sheet superposition means is formed by a fixed guide 352 and a movable guide 353 which is provided above the fixed guide 352. Portions other than a rotary guide 350, which are identical to those of the fifth embodiment, are denoted by similar reference numerals.

The movable guide 353 is provided to be switchable with respect to the fixed guide 352, for supporting a subsequent stripping sheet 5B discharged from first carrier rollers 310 and 310A in a closed state shown in FIG. 29. This movable guide 353 is driven to be opened on a side close to first carrier roller 310 and 310A as shown in FIG. 30, whereby a forward end portion of the temporarily supported subsequent stripping sheet SB can be placed on the lower fixed guide 352.

According to this embodiment, rotation of the first carrier rollers 310 and 310A and second carrier rollers 320 and 320A is stopped when a rear end superposition part W of a precedent stripping sheet 5A is placed on the fixed guide 352, to wait until the subsequent stripping sheet 5B is carried. When the subsequent stripping sheet 5B is carried, the first carriage rollers 310 and 310A are rotated to carry the same on the movable guide 353, as shown in FIG. 29.

Figure 30:
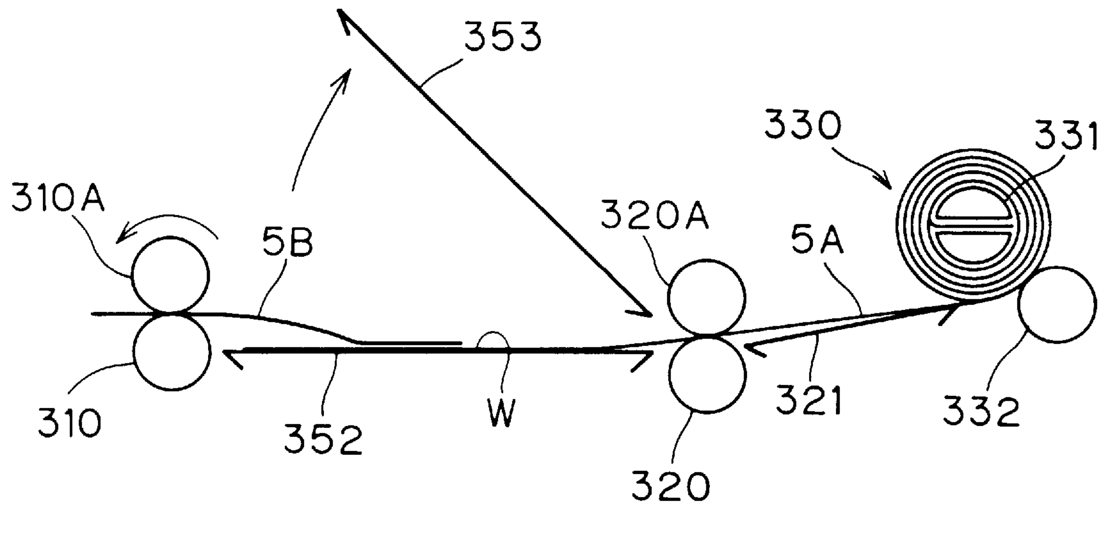

The first carrier rollers 310 and 310A are temporarily stopped when the forward end of the subsequent stripping sheet 5B reaches a portion close to the second carrier rollers 320 and 320A, and the movable guide 353 is opened to drop the forward end portion of the subsequent stripping sheet 5B which is placed on the movable guide 353 on the rear end superposition part W of the precedent stripping sheet 5A which is placed on the fixed guide 352, as shown in FIG. 30. Thus, the forward end portion of the subsequent stripping sheet 5B is superposed on the rear end superposition part W of the precedent stripping sheet 5A, and the first carrier rollers 310 and 310A and the second carrier rollers 320 and 320A are simultaneously rotated for carrying the precedent and subsequent stripping sheets 5A and 5B toward the roll-up means 330 in the superposed state, so that the same are rolled up on a roll-up shaft 331 similarly to the fifth embodiment.

While a mechanism provided on a carrier path for the rear end superposition part W of the precedent stripping sheet 5A is driven to superpose the forward end portion of the subsequent stripping sheet 5B on a roll-up inner side (roll-up shaft side) of the precedent stripping sheet 5A in the fifth embodiment, a mechanism provided on a carrier path for the forward end portion of the subsequent stripping sheet 5B is driven for superposing the same on a roll-up inner side (roll-up shaft side) of the precedent stripping sheet 5A in this embodiment.

The sheet collection part illustrated in each of the second to sixth embodiments is not restricted to an image recording unit, but can also be effectively utilized in relation to various types of sheets such as photographs and printed matters.

While the invention has been shown and described in detail, the foregoing description is in all aspects illustrative and not restrictive. It is therefore understood that numerous modifications and variations can be devised without departing from the scope of the invention.

We claim:

1. A separator for separating first and second sheets which are laminated together to form a composite film, comprising:

a) an end portion delaminator for delaminating said first and second sheets at an end portion of said composite film; and b) an overall separator, distinct said and portion delaminator, for separating said first and second sheets of said composite film;

wherein said end portion delaminator comprises a-1) a frame which defines a clearance over which said composite film is fed such that said end portion of said composite film bridges said clearance;

a-2) a blade for thrusting said end portion of said composite film into said clearance while bending said end portion to thereby delaminate said first and second sheets at said end portion;

a-3) a driver for pushing said blade into said clearance and for pulling said blade out of said clearance; and a-4) a handler for ejecting said end portion of both said first and second sheets from said clearance.

2. The separator in accordance with claim 1, wherein said driver comprises:

a rotary motor; and a link mechanism coupled to said rotary motor and said blade for converting rotation of said rotary motor into reciprocation of said blade.

3. The separator in accordance with claim 1, wherein said handling means comprises:

a transporter operable to feed said end portion of said composite film to said frame and operable to eject said end portion from said clearance after said end portion is thrust into said clearance by said blade.

4. The separator in accordance with claim 1, wherein said overall separator comprises:

b-1) first and second holders for holding said first and second sheets, respectively, and b-2) means for increasing a distance between said first and second holding means.

5. The separator in accordance with claim 1, wherein said overall separator comprises:

b-1) first and second cylindrical drums between which said end portion is fed;

b-2) first and second suction means provided in said first and second cylindrical drums for sucking said first and second sheets at said end portion, respectively; and b-3) means for rotating said first and second cylindrical drums to thereby separate said first and second sheets of said composite film.

6. The separator in accordance with claim 1, further comprising:

c) first and second rollers between which an adhesive tape is supplied;

d) means for serially supplying said first sheet on said adhesive tape between said first and second rollers;

e) means for rotating said first and second rollers, whereby respective portions of said first sheet are adhered to corresponding portions of said adhesive tape; and f) means for rolling-up said tape together with said first sheet.

7. The separator in accordance with claim 1, wherein said composite film is a preceding composite film followed by a subsequent composite film which is also comprised of first and second sheets, said first sheet separated from said preceding composite film is defined as a preceding first sheet, said first sheet separated from said subsequent composite film is defined as a subsequent first sheet, said separator further comprising:

c) superposing means for superposing a forward end of said subsequent first sheet to a rear end of said preceding first sheet, to thereby obtain a train of first sheets;

d) a roll-up shaft for rolling-up said train of first sheets such that said forward end of said subsequent first sheet is inserted between said rear end of said preceding first sheet and said roll-up shaft; and e) a roller for pressing said train of first sheets to said roll-up shaft.

8. The separator in accordance with claim 7, wherein said superposing means comprises:

c-1) guide means for guiding said preceding first sheet;

c-2) means for feeding said preceding first sheet along said guide means; and c-3) means for releasing said rear end of said preceding first sheet from said guide means such that said guide means accepts said forward end of said subsequent first sheet.

9. The separator in accordance with claim 7, wherein said superposing means comprises:

c-1) fixed guide means for guiding said preceding first sheet;

c-2) movable guide means for guiding said subsequent first sheet;

c-3) means for feeding said subsequent first sheet along said movable guide means; and c-4) means for moving said movable guide means to release said forward end of said subsequent first sheet onto said rear end of said preceding first sheet guided along said fixed guide means.

10. The separator in accordance with claim 7, wherein said roll-up shaft comprises:

d-1) means for reducing an outward form of said roll-up shaft, to thereby remove said train of first sheets rolled up from said roll-up shaft.

11. The separator in accordance with claim 1, wherein said overall separator comprises:

b-1) first and second rollers between which an adhesive tape is supplied;

b-2) means for serially supplying said composite film on said adhesive tape between said first and second rollers;

b-3) means for rotating said first and second rollers, whereby respective portions of said first sheet are adhered to corresponding portions of said adhesive tape; and b-4) means for pulling said adhesive tape from said first and second rollers to a direction different from that for feeding said composite film, to thereby separate said first and second sheets overall said composite film.

12. The separator in accordance with claim 11, further comprising:

c) a rotatable shaft around which a disposable tube is attached,wherein said adhesive tape and said first sheet are rolled-up around said disposable tube.

13. The separator in accordance with claim 1, wherein said overall separator is disposed downstream of said end portion delaminator in a direction in which said composite film is fed; and wherein said handler operates to feed said end portion of said composite film to said frame, eject said end portion of said first and second sheets from said clearance after said end portion is thrust into said clearance, pass said end portion over said clearance, and carry downstream said end portion to said overall separator.

14. A method of separating first and second sheets which are laminated together in the form of a composite film, comprising the steps of:

a) providing a frame which defines a clearance over which said composite film is fed such that an end portion of said composite film bridges said clearance;

b) thrusting said end portion of said composite film into said clearance by pushing a blade into said clearance and pulling said blade out of said clearance to bend said end portion, thereby delaminating said first and second sheets at said end portion;

c) carrying reversely said composite film to thereby eject said end portion of both said first and second sheets from said clearance; and d) separating said first and second sheets of said composite film.

15. The method of separating first and second sheets in accordance with claim 14, wherein said separating step d) comprises the steps of:

d-1) feeding said end portion between first and second cylindrical drums;

d-2) sucking said first and second sheets at said end portion by first and second suction means provided in said first and second cylindrical drums, respectively; and d-3) rotating said first and second cylindrical drums, to thereby separate said first and second sheets of said composite film.

16. The method of separating first and second sheets in accordance with claim 15, further comprising steps of:

e) supplying an adhesive tape between first and second rollers;

f) guiding said first sheet separated from said composite film on said adhesive tape between said first and second rollers;

g) rotating said first and second rollers, whereby respective portions of said first sheet are adhered to corresponding portions of said adhesive tape; and h) rolling-up said tape together with said first sheet.

17. The method of separating first and second sheets in accordance with claim 15, wherein said composite film is a preceding composite film followed by a subsequent composite film which is also comprised of first and second sheets, said first sheet separated from said preceding composite film is defined as a preceding first sheet, said first sheet separated from said subsequent composite film is defined as a subsequent first sheet, said method of separating first and second sheets comprises steps of:

e) superposing a forward end of a preceding first sheet to a rear end of a subsequent first sheet, to thereby obtain a train of first sheets;

f) rolling-up said train of first sheets around a roll-up shaft such that said forward end of said subsequent first sheet is inserted between said rear end of said preceding first sheet and said roll-up shaft; and g) pressing said train of first sheets to said roll-up shaft.

18. The method of separating first and second sheets in accordance with claim 14, wherein said step b) comprises steps of:

b-1) supplying an adhesive tape between first and second rollers;

b-2) supplying said composite film serially on said adhesive tape between said first and second rollers;

b-3) rotating said first and second rollers, whereby respective portions of said first sheet are adhered to corresponding portions of said adhesive tape; and b-4) pulling said adhesive tape from said first and second rollers to a direction different from that for feeding said composite film, to thereby separate said first and second sheets overall said composite film.

19. An image recorder for recording an image on a composite film which is formed by laminating together a necessary sheet and an unnecessary sheet, said image recorder comprising:

an image former for forming said image on said necessary sheet of said composite film;

a feeder for feeding said composite film to said image former; and means for separating said composite film on which said image is recorded, comprising an end portion delaminator for delaminating said necessary sheet from said unnecessary sheet at an end portion of said composite film, and an overall separator, distinct from said end portion delaminator, for separating said first and second sheets of said composite film;

wherein said end portion delaminator comprises a frame which defines a clearance over which said composite film is fed such that said end portion of said composite film bridges said clearance, a blade for thrusting said end portion of said composite film into said clearance while bending said end portion to thereby delaminate said necessary sheet and said unnecessary sheet at said end portion, a driver for pushing said blade into said clearance and for pulling said blade out of said clearance, and a handler for carrying reversely said composite film, to thereby eject said end portion of both said first and second sheets from said clearance.

20. The image recorder in accordance with claim 19, wherein said feeder comprises:

a roll holder for holding a roll of said composite film; and a cutter for cutting said composite film drawn from said roll to a predetermined length.

21. The image recorder in accordance with claim 19, wherein said separator comprises:

means for carrying said necessary sheet upward; and means for carrying said unnecessary sheet downward.

* * * * *